United States Patent
Yamaguchi et al.

(10) Patent No.: US 8,936,211 B2
(45) Date of Patent: Jan. 20, 2015

(54) METHOD OF MANUFACTURING STATOR AND COIL INSERTION APPARATUS

(71) Applicants: Yasuo Yamaguchi, Kariya (JP); Katsuyuki Hayashi, Inazawa (JP); Shigeki Sato, Inazawa (JP)

(72) Inventors: Yasuo Yamaguchi, Kariya (JP); Katsuyuki Hayashi, Inazawa (JP); Shigeki Sato, Inazawa (JP)

(73) Assignee: Aisin AW Co., Ltd., Anjo (JP)

( * ) Notice: Subject to any disclaimer, the term of this patent is extended or adjusted under 35 U.S.C. 154(b) by 203 days.

(21) Appl. No.: 13/709,518

(22) Filed: Dec. 10, 2012

(65) Prior Publication Data

US 2013/0153702 A1    Jun. 20, 2013

(30) Foreign Application Priority Data

Dec. 15, 2011   (JP) ................................. 2011-274809

(51) Int. Cl.
| | |
|---|---|
| *B65H 81/02* | (2006.01) |
| *H01F 41/06* | (2006.01) |
| *H02K 15/00* | (2006.01) |
| *H02K 15/06* | (2006.01) |

(52) U.S. Cl.
CPC ............ *H01F 41/06* (2013.01); *H02K 15/0037* (2013.01); *H02K 15/068* (2013.01)
USPC ........................... 242/434; 242/432.5; 29/565

(58) Field of Classification Search
USPC ........................ 242/432.5, 432.6, 434; 29/596
See application file for complete search history.

(56) References Cited

U.S. PATENT DOCUMENTS

| | | | | |
|---|---|---|---|---|
| 3,507,029 | A | * | 4/1970 | Mannes et al. ................... 29/734 |
| 4,291,459 | A | * | 9/1981 | Barrera ............................. 29/734 |
| 4,536,954 | A | * | 8/1985 | Hattori ............................. 29/734 |
| 4,750,258 | A | * | 6/1988 | Anderson ........................ 29/596 |
| 4,831,715 | A | * | 5/1989 | Witwer ............................ 29/596 |
| 5,657,530 | A | * | 8/1997 | Kawamura et al. ............. 29/596 |
| 5,802,706 | A | * | 9/1998 | Barrett ............................. 29/736 |
| 5,860,615 | A | * | 1/1999 | Burch ......................... 242/432.5 |
| 6,282,775 | B1 | * | 9/2001 | Barrett ............................. 29/596 |
| 6,619,578 | B2 | * | 9/2003 | Stockman et al. ............. 242/433 |
| 6,640,421 | B2 | * | 11/2003 | Katsuzawa et al. ............. 29/732 |

(Continued)

FOREIGN PATENT DOCUMENTS

| | | |
|---|---|---|
| JP | A-S61-244246 | 10/1986 |
| JP | A-H5-236712 | 9/1993 |

(Continued)

OTHER PUBLICATIONS

Mar. 26, 2013 International Search Report issued in International Application No. PCT/JP2012/082082 (with translation).

*Primary Examiner* — Emmanuel M Marcelo
(74) *Attorney, Agent, or Firm* — Oliff PLC

(57) ABSTRACT

A method of manufacturing a stator includes a first winding step of, with annular conductors of a first coil portion being placed in a coil holding unit, inserting the annular conductors into the respective slots by a coil pushing-out unit; and a second winding step of, after the first coil winding step, with annular conductors of a second coil portion placed in the coil holding unit, moving a positioning unit in an axial direction at least from one end of the stator core to the other end of the stator core in the axial direction, and inserting the annular conductors into the respective slots by the coil pushing-out unit while a part of the first coil portion, which is located in the slots, is pressed in a direction from the opening of the slot toward an inside of the slot by the radial end faces of the projecting teeth.

7 Claims, 16 Drawing Sheets

(56) References Cited

U.S. PATENT DOCUMENTS

| | | | |
|---|---|---|---|
| 6,749,144 B2* | 6/2004 | Komuro et al. | 242/432.5 |
| 2007/0143983 A1* | 6/2007 | Yamaguchi et al. | 29/596 |
| 2007/0261229 A1* | 11/2007 | Yamaguchi et al. | 29/596 |
| 2009/0083964 A1* | 4/2009 | Tokizawa | 29/596 |
| 2012/0117790 A1* | 5/2012 | Carpentier et al. | 29/596 |
| 2014/0215806 A1 | 8/2014 | Yamaguchi et al. | |

FOREIGN PATENT DOCUMENTS

| | | |
|---|---|---|
| JP | A-H8-205488 | 8/1996 |
| JP | A-9-135555 | 5/1997 |
| JP | A-2000-069723 | 3/2000 |
| JP | A-2011-182478 | 9/2011 |
| WO | WO 2013/051469 | 4/2014 |

* cited by examiner

F I G . 1
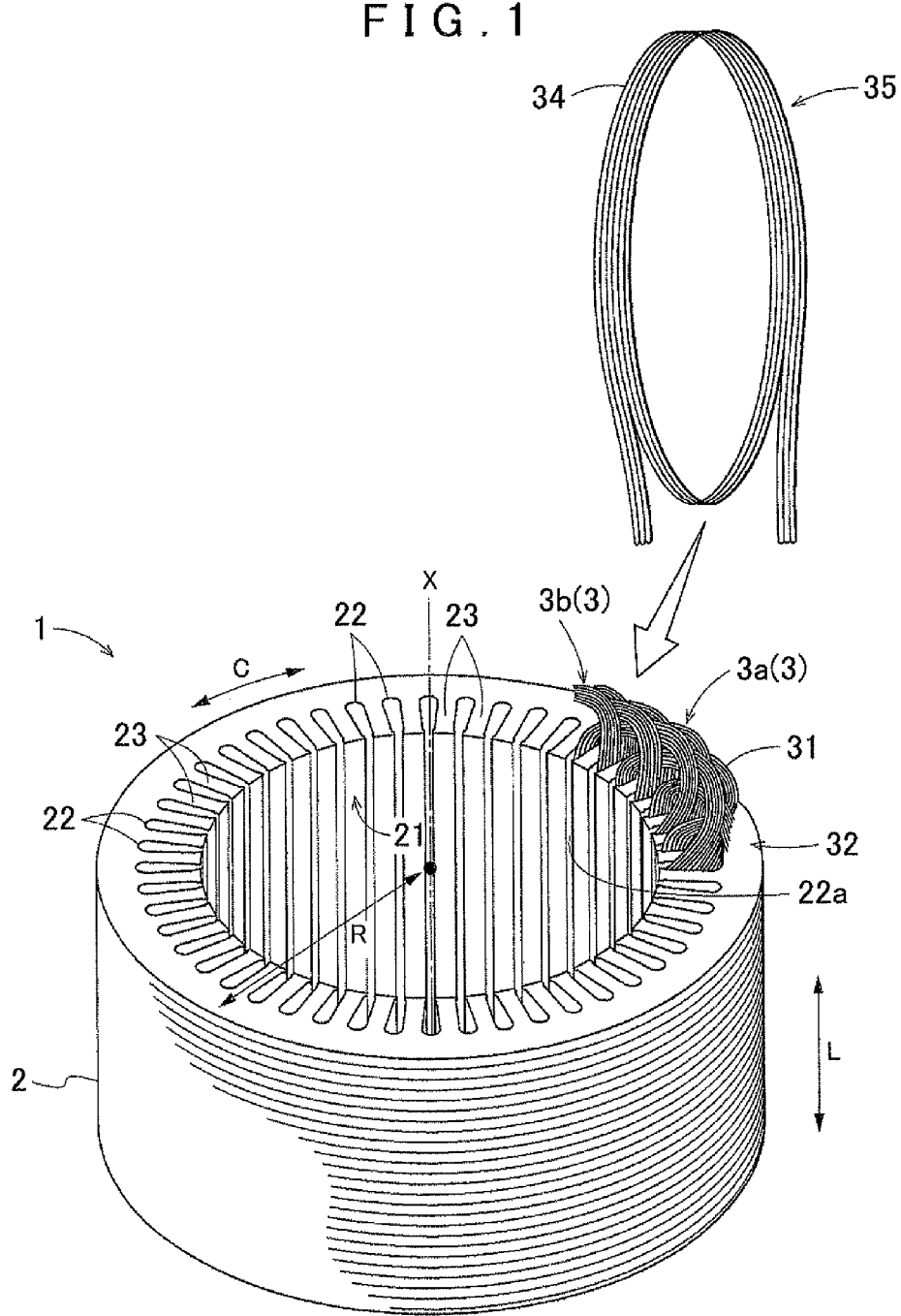

F I G. 8
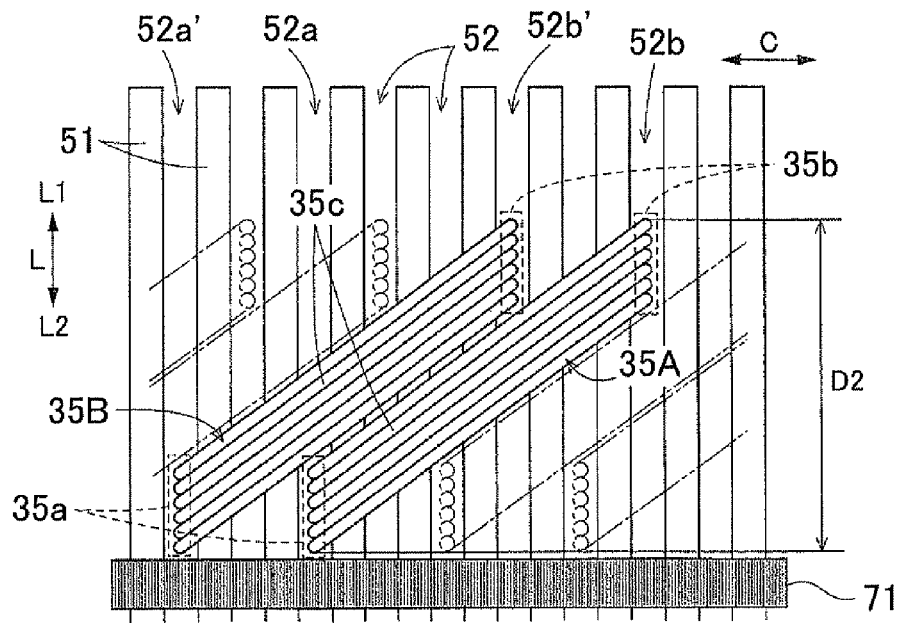
F I G. 9
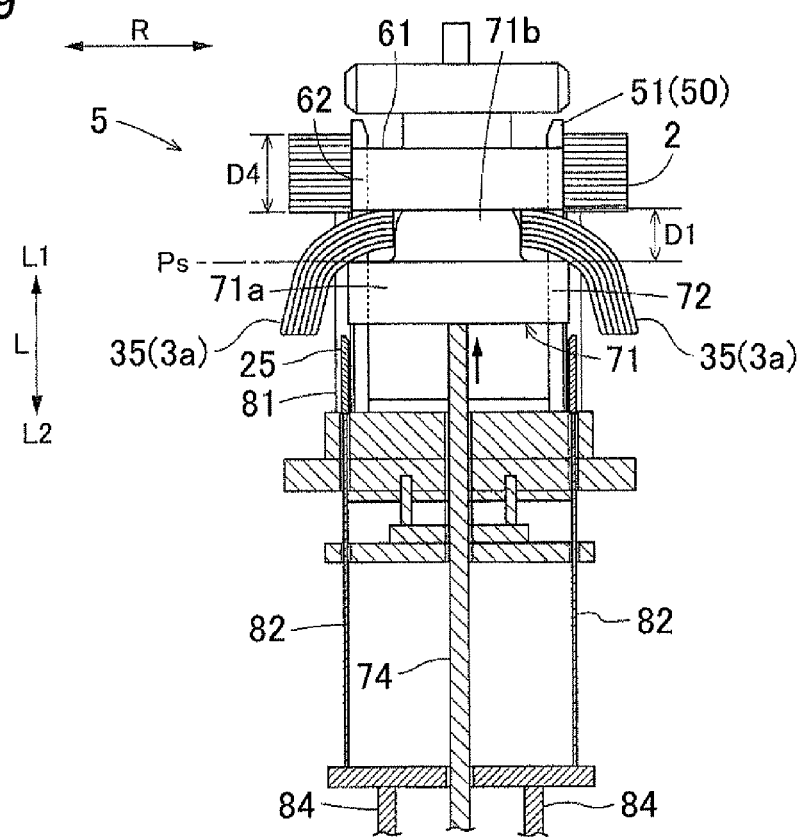

METHOD OF MANUFACTURING STATOR AND COIL INSERTION APPARATUS

INCORPORATION BY REFERENCE

The disclosure of Japanese Patent Application No. 2011-274809 filed on Dec. 15, 2011 including the specification, drawings and abstract is incorporated herein by reference in its entirety.

BACKGROUND OF THE INVENTION

The present invention relates to a method of manufacturing a stator by winding a coil on a stator core by using a coil insertion apparatus, and the coil insertion apparatus for the method of manufacturing a stator.

DESCRIPTION OF THE RELATED ART

For example, a method described in Japanese Patent Application Publication No. 2000-69723 (JP 2000-69723 A) is known as one of the methods for manufacturing a stator by winding a coil on a stator core. In the description of the "Description of the Related Art" section, the names of the members in JP 2000-69723 A are shown in parentheses "[ ]". In the method of JP 2000-69723 A, annular conductors each formed in an annular shape are inserted into slots of a stator core by using a coil insertion apparatus. The method of JP 2000-69723 A is directed to manufacturing of a coil having a first coil portion [coil 39 for first insertion] and a second coil portion [coil 41 for second insertion] which are wound on the stator core so as to adjoin each other in the radial direction.

The coil insertion apparatus of JP 2000-69723 A includes a coil pushing-up unit divided into two units [first stripper 23 and second stripper 19]. One of the divided coil pushing-up units (herein referred to as the "first coil pushing-up unit") [first stripper 23] has an expanded portion [49b] at the tip end of a pushing-in tooth [projecting portion 49a] projecting along the radial direction. When the first coil pushing-up unit inserts the annular conductor of the first coil portion into the slot, the expanded portion of the first coil pushing-up unit simultaneously compresses a part of the first coil portion, which is located in the slot, in the radial direction within the slot. Then, the other of the divided coil pushing-up units inserts the annular conductor of the second coil portion into a space in the slot which is created by the compression step. This suppresses damage to the coil due to friction between the annular conductors of the first and second coil portions, etc.

As described above, in the method and apparatus of JP 2000-69723 A, the first coil pushing-up unit placed on the front side in the coil insertion direction is provided with the expanded portion so that the compressing step can be performed. However, since the coil pushing-up unit, which is normally provided as a single member, is divided into two units, the configuration of the coil insertion apparatus is complicated.

SUMMARY OF THE INVENTION

It is desired to implement a method of manufacturing a stator, which can suppress damage to a coil without complicating the configuration of a coil insertion apparatus. It is also desired to implement a coil insertion apparatus that is suitable for such a method.

According to a first aspect of the present invention, in a method of manufacturing a stator by winding a coil on a stator core by using a coil insertion apparatus, the coil has a first coil portion and a second coil portion that are placed so as to adjoin each other in a radial direction when mounted on the stator core, the coil insertion apparatus includes a coil holding unit that has blades arranged along a circumferential direction and extending in an axial direction so as to face teeth of the stator core, respectively, a positioning unit that is fitted on the blades to adjust a positional relation between the blades and a coil pushing-out unit that pushes out the coil held in the coil holding unit toward slots of the stator core, the positioning unit has projecting teeth each extending between adjoining ones of the blades and protruding toward the stator core along a radial direction and is formed such that a radial end face of each of projecting teeth is located at a position in the slot, which is located inward of an opening of the slot. The method of manufacturing a stator includes: a first coil winding step of, with annular conductors of the first coil portion being placed in the coil holding unit, inserting the annular conductors into the respective slots by the coil pushing-out unit; and a second coil winding step of, after the first coil winding step, with annular conductors of the second coil portion being placed in the coil holding unit, moving the positioning unit in the axial direction at least from one end of the stator core in the axial direction to the other end of the stator core in the axial direction, and inserting the annular conductors into the respective slots by the coil pushing-out unit while a part of the first coil portion, which is located in the slots, is pressed in a direction from the opening of the slot toward an inside of the slot by the radial end faces of the projecting teeth.

According to the first aspect, the positioning unit is formed such that the radial end face of each of the projecting teeth is located at the position in the slot, which is located inward of the opening of the slot. Thus, in the second coil winding step, the first coil portion can be pressed inside the slots by the radial end faces of the projecting teeth. Accordingly, the annular conductors of the second coil portion can be inserted into the slots while increasing the density of the first coil portion in each slot and creating, on the opening side of each slot, a space for placing the second coil portion in the slot. This can suppress damage to the coil.

Additionally, according to the first aspect, a portion that presses the first coil portion in the slots (the projecting teeth having a predetermined shape) is provided in the positioning unit. In the coil insertion apparatus, such a positioning unit is provided separately from the coil pushing-out unit in order to adjust the positional relation between the blades. Thus, the above effects can be obtained by making a slight improvement in a coil insertion apparatus with a commonly used configuration without complicating the configuration of the coil insertion apparatus such as dividing the coil pushing-out unit into multiple units.

The method of manufacturing a stator may be configured as follows: each of coil end portions of the first coil portion and the second coil portion, which protrudes from the stator core in the axial direction of the stator core, includes link portions connecting different ones of the slots of the stator core and extending in the circumferential direction of the stator core, each of the link portions is placed such that one end of the link portion in the circumferential direction is located inward, in the radial direction, of any other of the link portions which is located at the same position as the link portion in the circumferential direction, and such that the other end in the circumferential direction is located outward, in the radial direction, of any other of the link portions which is located at the same position as the link portion in the circumferential direction, and each of the first coil winding step and the second coil winding step has a coil placement step of placing the annular conductors in the coil holding unit, in which the annular conductors are placed such that a first portion of each of the annular conductors is inserted into a first hanging gap formed between the blades, a second portion thereof is inserted into a second hanging gap located a predetermined pitch away from the first hanging gap, and a joint portion connecting the first portion and the second portion of each of the annular conductors extends on one side in the axial direction with respect to the first portion of any other of the annular conductors which is positioned to overlap the joint portion as viewed in the axial direction, a coil deformation step of, after the coil placement step, with a position of the positioning unit being fixed with respect to the coil holding unit, moving the coil pushing-out unit in the axial direction along the blades to a set position where an axial interval between the positioning unit and the coil pushing-out unit is shorter than an overall length of the annular conductors in the axial direction before deformation, thereby deforming the joint portions of the annular conductors, and a coil insertion step of, after the coil deformation step, further moving the coil pushing-out unit in the axial direction to insert the first portions and the second portions of the annular conductors into the slots.

In the coil placement step, the annular conductors are placed in the coil holding unit in a manner shown in the above configuration. Thus, preparations can be appropriately made for manufacturing of a stator including a coil portion in which each of link portions is placed such that one end of the link portion in the circumferential direction is located inward, in the radial direction, of any other of the link portions which is located at the same position as the link portion in the circumferential direction and such that the other end in the circumferential direction is located outward, in the radial direction, of any other of the link portions which is located at the same position as the link portion in the circumferential direction (herein referred to as the "spiral coil portion"). In the coil deformation step that is performed after the coil placement step, the annular conductors are pressed between the positioning unit and the coil pushing-out unit to deform the joint portions of the annular conductors. Thus, the shape of the joint portions can be changed to a shape close to that of the coil end portion after being wound on the stator core. In this state, the coil insertion step is performed so that the joint portions of the annular conductors after deformation are positioned as the link portions so as to protrude from the stator core in the axial direction, and the first portions and the second portions are placed in the slots. At this time, in the coil deformation step, the joint portions of the annular conductors have already been deformed to the shape close to that of the coil end portion after being wound on the stator core. This facilitates insertion of the annular conductors into the slots. Since the coil placement step, the coil deformation step, and the coil insertion step are performed in each of the first coil winding step and the second coil winding step, the stator having two spiral coil portions placed so as to adjoin each other in the radial direction can be appropriately manufactured.

The method of manufacturing a stator may be configured as follows: an end of the coil holding unit on an axial first direction side, which is one side of the coil holding unit in the axial direction, corresponds to open ends of the blades, and the coil holding unit has a holding portion that integrally holds the blades on an axial second side, which is the other side of the coil holding unit in the axial direction, with respect to the open ends, the coil placement step in the second coil winding step is performed after the first coil winding step with the positioning unit being located on the axial first direction side with respect to the coil holding unit, and between the coil placement step of the second coil winding step and the coil deformation step of the second coil winding step, the positioning unit is moved in the axial direction toward the axial second direction side from a position on the axial first direction side with respect to the coil holding unit to a position where an end of the positioning unit on the axial second direction side is aligned with the end of the stator core on the axial second direction side, or to a position located on the axial second direction side with respect to the position where the end of the positioning unit on the axial second direction side is aligned with the end of the stator core on the axial second side, and in the coil insertion step of the second coil winding step, the positioning unit is moved in the axial direction toward the axial first direction side.

According to this configuration, in the coil placement step of the second coil winding step, the annular conductors of the second coil portion can be inserted and placed in the coil holding unit from the open end side without being obstructed by the positioning unit. Then, in the second coil winding step, the positioning unit is moved toward the axial second direction side along the entire length in the axial direction of the stator core between the coil placement step and the coil deformation step. Thus, the entire part of the first coil portion, which is located in the slots, can be compressed in the radial direction. At this time, the positioning unit is moved to the position where the end of the positioning unit on the axial second direction side is aligned with the end of the stator core on the axial second direction side, or to the position located on the axial second direction side with respect to that position, whereby the entire part of the first coil portion, which is located in the slots, can be compressed, and at the same time, preparations can be appropriately made for the coil deformation step that is performed before the coil insertion step. That is, the annular conductors of the first coil portion can be compressed in the radial direction during a series of rational operations in a transition stage from the coil placement step to the coil deformation step in the second coil winding step. Then, in the coil insertion step, the positioning unit is moved toward the axial first direction side, whereby the annular conductors of the second coil portion can be inserted into the slots by the coil pushing-out unit while the first coil portion inside the slots is pressed. This can effectively suppress damage to the coil.

According to a second aspect of the present invention, a coil insertion apparatus for winding a coil on a stator core includes: a coil holding unit that has blades arranged along a circumferential direction and extending in an axial direction so as to face teeth of the stator core, respectively; a positioning unit that is fitted on the blades to adjust a positional relation between the blades; and a coil pushing-out unit that pushes out the coil held in the coil holding unit toward slots of the stator core. In the coil insertion apparatus, the positioning unit has projecting teeth each extending between adjoining ones of the blades and protruding toward the stator core along a radial direction, and the positioning unit is formed such that, with the positioning unit being placed at the same position in the axial direction as the stator core, a radial end face of each of the projecting teeth is located at a position in the slot, which is located inward of an opening of the slot.

According to the second aspect, the positioning unit is formed such that, with the positioning unit being placed at the same position in the axial direction as the stator core, the radial end face of each of the projecting teeth is located at the position in the slot, which is located inward of the opening of the slot. Thus, a predetermined part of a conductor of the coil can be pressed inside the slots by the radial end faces of the projecting teeth. Accordingly, another conductor of the coil can be inserted into the slots while increasing the density of the coil in each slot and creating a space in each slot on the opening side of the slot. Alternatively, the predetermined part of the conductor of the coil can be compressed inside the slots by the radial end faces of the projecting teeth. Accordingly, the density of the coil in each slot can be increased, and a space can be created in each slot on the opening side of the slot, whereby another conductor of the coil can be placed in this space. In these cases, damage to the conductors due to friction between the conductors that are separately inserted by a plurality of insertion operations, etc. can be suppressed.

In the above characteristic configuration, a portion that presses or compresses a predetermined part of the coil in the slots (the projecting teeth having a predetermined shape) is provided in the positioning unit. In the coil insertion apparatus, such a positioning unit is provided separately from the coil pushing-out unit in order to adjust the positional relation between the blades. Thus, a coil insertion apparatus can be implemented in which the above effects can be obtained by making a slight improvement in a coil insertion apparatus with a commonly used configuration without complicating the configuration such as dividing the coil pushing-out unit into multiple units.

The coil insertion apparatus may be configured such that the radial end face has a width in the circumferential direction which corresponds to a width of the slot in the circumferential direction, and that the radial end face is placed at a position in the radial direction, which divides an area of a cross section perpendicular to the axial direction of the slot into two equal parts.

According to this configuration, the entire conductor can be reliably pressed or compressed in the radial direction in each slot in the entire region in the circumferential direction. Moreover, the space in each slot can be divided into two spaces having approximately the same volume by the radial end face of the projecting tooth. Thus, when manufacturing a stator that includes a coil having two coil portions placed so as to adjoin each other in the radial direction, the two coil portions can be equally placed in the slots. Accordingly, a coil insertion apparatus can be implemented which is suitable for manufacturing of a stator including such a coil.

The coil insertion apparatus may be configured such that the projecting tooth has a tilted surface that extends in the radial direction from the opening of the slot toward an inside of the slot as the tilted surface extends from an end of the projecting tooth in the axial direction toward a central portion of the projecting tooth in the axial direction.

According to this configuration, with axial movement of the positioning unit, a predetermined portion of the conductor can be smoothly pushed out from the opening side of the slot toward the inside of the slot along the tilted surface. This can effectively suppress damage to the conductor due to friction between the conductor of the coil and the end of the projecting tooth in the axial direction.

BRIEF DESCRIPTION OF THE DRAWINGS

FIG. 1 is a perspective view of a stator according to an embodiment;
FIG. 8 is a schematic diagram showing the state where annular conductors are placed in a first coil placement step;
FIG. 9 is a diagram showing the state of the coil insertion apparatus in a first coil deformation step.

DETAILED DESCRIPTION OF THE EMBODIMENTS

Figure 2:
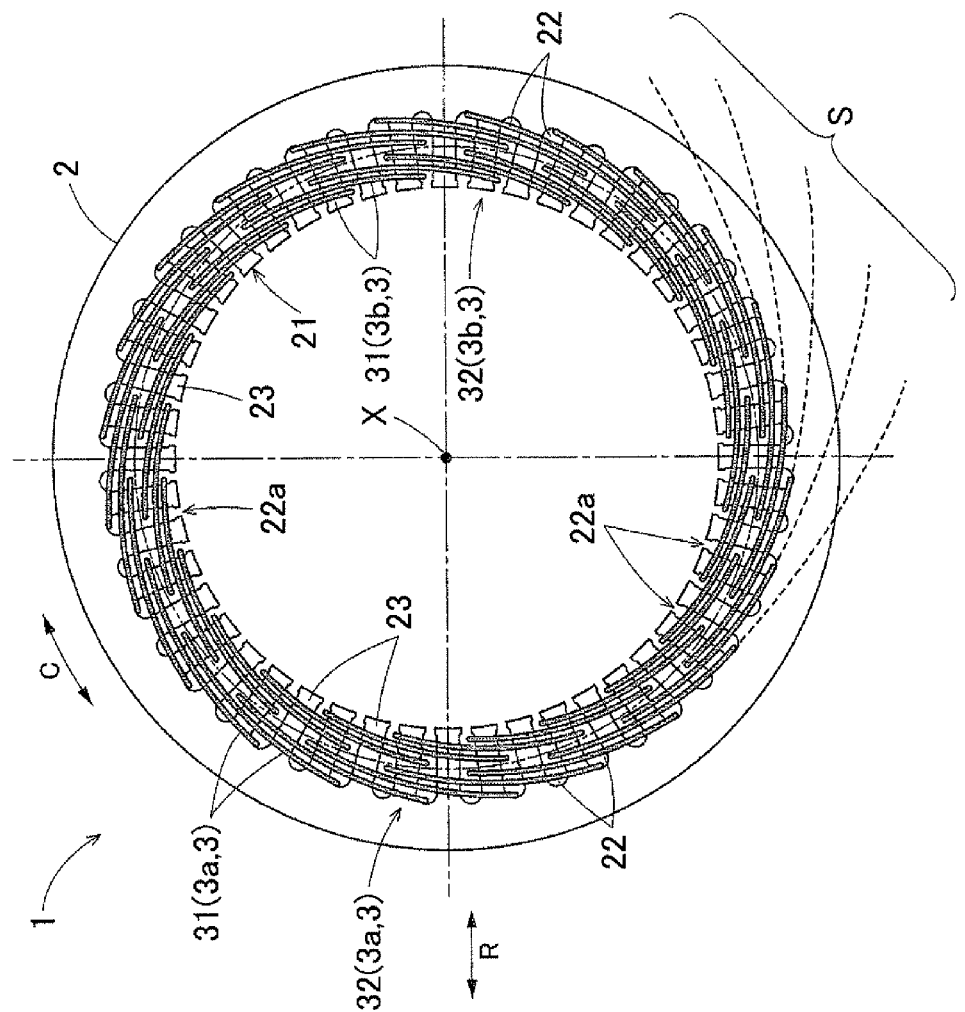
FIG. 2 is a plan view schematically showing a coil end portion as viewed in the axial direction.

A method of manufacturing a stator according to the present invention will be described below with reference to the accompanying drawings. The method of manufacturing a stator according to the present invention is a method for manufacturing a stator 1 by winding a coil 3 on a stator core 2 by using a coil insertion apparatus 5. The method of manufacturing a stator according to the present embodiment can suppress damage to the coil 3 without complicating the configuration of the coil insertion apparatus 5. The configuration of the stator 1 to be manufactured, the configuration of the coil insertion apparatus 5 to be used to wind the coil 3 on the stator core 2 in a manufacturing stage, and the method of manufacturing a stator using the coil insertion apparatus 5 will be described below in this order.

In the following description, the "axial direction L," the "circumferential direction C," and the "radial direction R" are defined with respect to the central axis X of a cylindrical core reference surface 21 of the stator core 2 (e.g., the inner peripheral surface of the stator core 2), unless otherwise specified. The positions of members of the coil insertion apparatus 5 are defined with respect to the central axis X of the core reference surface 21 in the state where the stator core 2 is mounted (set) in a normal manner on the coil insertion apparatus 5. In the present embodiment, the "axial first direction L1 side" refers to the side of the coil holding unit 50 on which the open ends of blades 51 included in the coil insertion apparatus 5 are provided (the upper side in FIG. 3), and the "axial second direction L2 side" refers to the opposite side thereto (the lower side in FIG. 3).

The terms regarding the directions, positions, etc. of the members (e.g., "perpendicular," "aligned," etc.) are used as a concept including the state where the directions, positions, etc. of the members are varied due to an allowable manufacturing error.

1. Configuration of Stator

The configuration of the stator 1 according to the present embodiment will be described with reference to FIGS. 1 and 2. The stator 1 is a stator of an inner rotor type rotating electrical machine. As used herein, the term "rotating electrical machine" is used as a concept including a motor (an electric motor), a generator (an electric generator), and a motor-generator that functions both as the motor and the generator as necessary. As shown in FIG. 1, the stator 1 includes a stator core 2 and a coil 3. In order to avoid complication, FIG. 1 shows only a part of coil end portions 32 as portions of the coil 3 which project in the axial direction L from the stator core 2, and does not show the remaining part of the coil end portions 32.

The stator core 2 is formed by using a magnetic material. The stator core 2 has slots 22 distributed in the circumferential direction C of the cylindrical core reference surface 21, and teeth 23 each formed between two of the slots 22 which adjoin each other in the circumferential direction C. As used herein, the "cylindrical core reference surface 21" refers to an imaginary surface that is used as a reference regarding the arrangement and configuration of the slots 22. As shown in FIG. 1, in the present embodiment, the core reference surface 21 is a core inner peripheral surface as an imaginary cylindrical surface including the inner end faces of the teeth 23 in the radial direction R, each formed between adjoining two of the slots 22. The core reference surface 21 may be the outer peripheral surface of the stator core 2, etc.

The slots 22 are distributed at regular intervals along the circumferential direction C. The slots 22 are formed to extend in the axial direction L, and to extend in the radial direction R in a radial pattern from the central axis X of the stator core 2. Each slot 22 has the same shape, and is formed in a groove shape extending in the axial direction L and the radial direction R and having a predetermined width in the circumferential direction C. A sheet-like insulating member (not shown) is provided on the inner wall surface of each slot 22. Each slot 22 has an opening (in this example, an inner peripheral opening 22a) that opens inward in the radial direction R (that opens in the inner peripheral surface of the stator core 2). In each slot 22, the opening width of the inner peripheral opening 22a is narrower than the width of the part of the slot 22 which is located outward of the inner peripheral opening 22a in the radial direction R. That is, the slots 22 of the present embodiment are configured as semi-open slots. A wedge 25, which is formed by a sheet-like member made of a synthetic resin, etc., is placed in the inner end of each slot 22 in the radial direction R so as to close the inner peripheral opening 22a (see FIG. 6).

Each of the teeth 23 is formed between adjoining two of the slots 22, and the teeth 23 are distributed at regular intervals along the circumferential direction C. Each of the teeth 23 has the same shape, and is formed in a thick plate shape extending in the axial direction L and the radial direction R and having a predetermined width in the circumferential direction C. In the present embodiment, the teeth 23 are formed so that two side surfaces of each of the teeth 23, which face in the circumferential direction C, are parallel to each other. That is, the teeth 23 in the present embodiment are configured as parallel teeth.

In the present embodiment, the rotating electrical machine is an alternating current (AC) electric motor that is driven by a multiphase alternating current (in this example, three phases). In this example, the coil 3 of the stator 1 is divided into a U-phase coil, a V-phase coil, and a W-phase coil corresponding to the three phases (U-phase, V-phase, and W-phase), respectively. Accordingly, the slots 22 for U-phase, V-phase, and W-phase are arranged in a repeated pattern of U-phase, V-phase, and W-phase along the circumferential direction C in the stator core 2. In this example, the slots 22 for U-phase, V-phase, and W-phase are arranged in a repeated pattern of two slots for U-phase, two slots for V-phase, and two slots for W-phase along the circumferential direction C in the stator core 2. Accordingly, the coil 3 is wound on the stator core 2 in a repeated pattern of two U-phase coils, two V-phase coils, and two W-phase coils along the circumferential direction C.

The coil 3 has a first coil portion 3a and a second coil portion 3b which are placed so as to adjoin each other in the radial reaction R when wound on the stator core 2. In the present embodiment, the first coil portion 3a is placed outward of the second coil portion 3b in the radial direction R. In the present embodiment, the coil 3 is configured as a 2-set wound coil having no coil portion other than the first coil portion 3a and the second coil portion 3b.

Each of the first coil portion 3a and the second coil portion 3b which form the coil 3 has the coil end portion 32 that projects from the stator core 2 in the axial direction L of the stator core 2. The coil end portion 32 of each coil portion 3a, 3b has link portions 31 each linking different ones of the slots 22 of the stator core 2 and extending in the circumferential direction C of the stator core 2. As shown in FIG. 1, each link portion 31 is placed so as to link two slots 22 that are located five slot pitches away from each other. Each link portion 31 is placed so as to be intertwined with other link portions 31 extending from the four slots 22 located between the two slots 2 on both sides of the link portion 31, and so as to have a portion that overlaps these other link portions 31 as viewed in the axial direction L and the radial direction R. Regarding arrangement of two members, the expression "have a portion that overlaps as viewed in a predetermined direction" as used herein means that when the predetermined direction is a viewing direction and a viewpoint is shifted along a direction perpendicular to the viewing direction, the viewpoint from which the two members are seen to overlap each other is present at least in a region.

In each coil portion 3a, 3b, each of the link portions 31 is placed such that an end of the link portion 31 on one side of the stator core 2 in the circumferential direction C (the side in the clockwise direction in FIG. 2) is located inward, in the radial direction R, of any other of the link portions 31 which is located at the same position as the link portion 31 in the circumferential direction C, and such that an end of the link portion 31 on the other side of the stator core 2 in the circumferential direction C (the side in the counterclockwise direction in FIG. 2) is located outward, in the radial direction C, of any other of the link portions 31 which is located at the same position as the link portion 31 in the circumferential direction C. Each link portion 31 is placed so as to extend from the inner side of the stator core 2 in the radial direction R toward the outer side of the stator core 2 in the radial direction R and from one side of the stator core 2 in the circumferential direction C toward the other side of the stator core 2 in the circumferential direction C, and so that two link portions 31 adjoining each other in the circumferential direction C partially overlap each other as viewed in the radial direction R.

In this case, the link portions 31 of each coil portion 3a, 3b are designed to be placed along respective spiral lines S extending outward in the radial direction R from the central axis X of the stator core 2 as viewed in the axial direction L. As used herein, the term "spiral lines S" refers to plane curves having a spiral pattern (including plane straight lines, plane bent lines, etc.). The expression "extend outward in the radial direction R from the central axis X" refers to extending at least outward in the radial direction R from a central axis X side, and does not mean that an imaginary extended line of the spiral line S needs to pass through the central axis X. FIG. 2 schematically shows the link portions 31 as viewed in the axial direction L. As described above, the coil 3 according to the present embodiment has two sets of coil end portions (spiral coil end portions) 32 in which the link portions 31 are arranged in a spiral pattern as a whole as viewed in the axial direction L. Hereinafter, the coil 3 having such spiral coil end portions 32 is sometimes referred to as the "spiral coil 3," and the coil portions 3a, 3b having the spiral coil end portions 32 are sometimes referred to as the "spiral coil portions 3a, 3b."

The coil 3 is formed by annular conductors 35 described below. The annular conductor 35 is formed by a bundle of a plurality of linear conductors 34. The linear conductor 34 is a conductor having a linear shape and being made of a metal such as copper or aluminum, and an insulating coating film made of a resin etc, is formed on the surface of the linear conductor 34. As used herein, the term "plurality of" means that there is a plurality of linear conductors in each cross section perpendicular to the extending direction of the linear conductors 34, and the linear conductors 34 themselves may be connected together as a single linear conductor. In the present embodiment, a set of three linear conductors 34 is wound a plurality of times to form the annular conductor 35 formed by the bundle of the plurality of linear conductors 34. A single linear conductor 34 or a set of K linear conductors 34 (K represents an integer of 2 or more) may be wound a plurality of times to form the annular conductor 35 formed by the bundle of the plurality of linear conductors 34. Various known methods can be used to wind the coil 3 formed by the annular conductors 35 on the stator core 2. In this example, the coil 3 is wound on the stator core 2 by lap winding and distributed winding.

2. Configuration of Coil Insertion Apparatus

Figure 3:
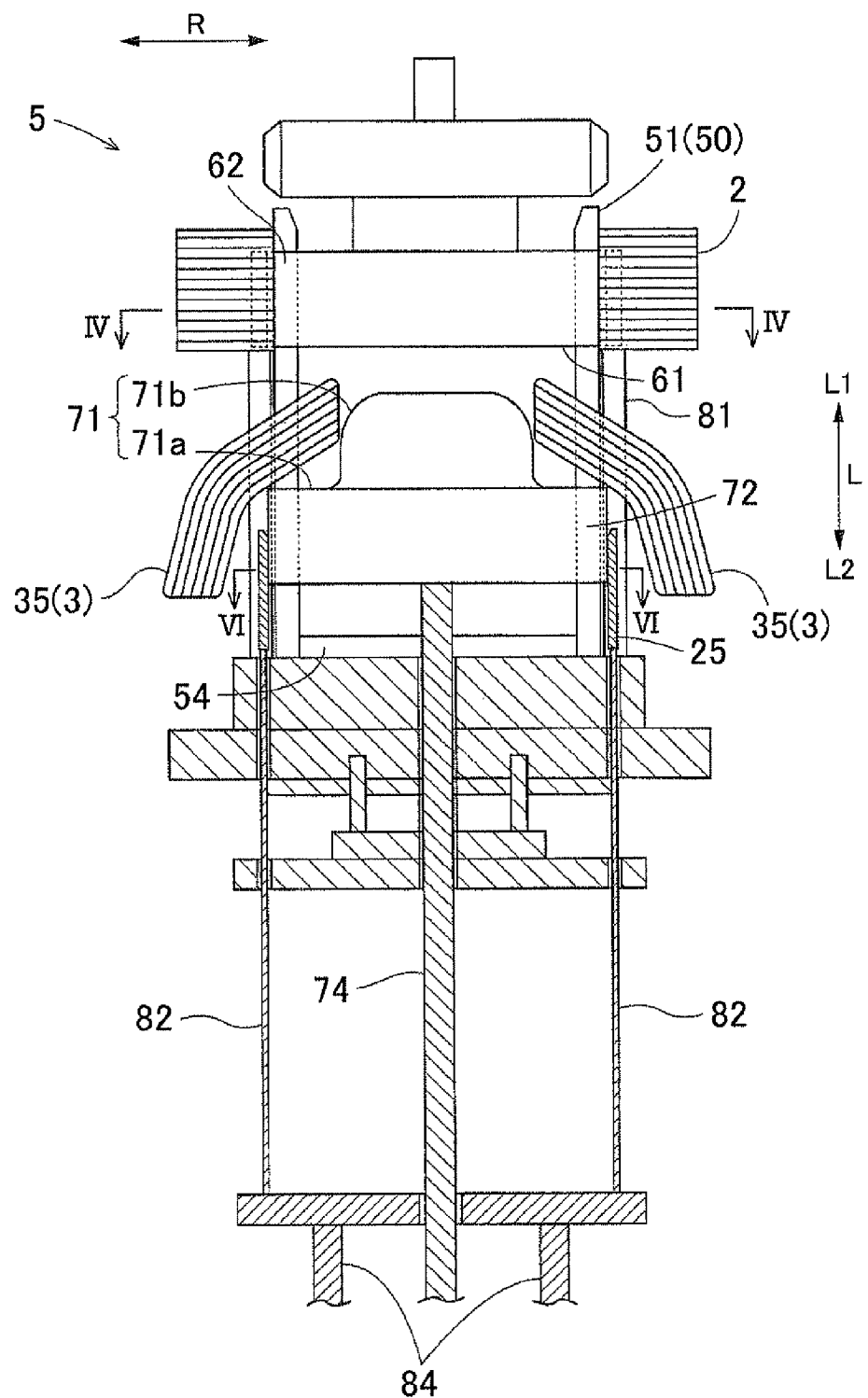
FIG. 3 is a schematic configuration diagram showing a coil insertion apparatus according to the embodiment.

The configuration of the coil insertion apparatus 5 according to the present embodiment will be described with reference to FIGS. 3 to 6. As shown in FIG. 3, the coil insertion apparatus 5 includes as main components a coil holding unit 50, a positioning unit 61, and a coil pushing-out unit 71. The coil insertion apparatus 5 further includes wedge guide members 81 and a wedge pushing-up unit 82.

Figure 4:
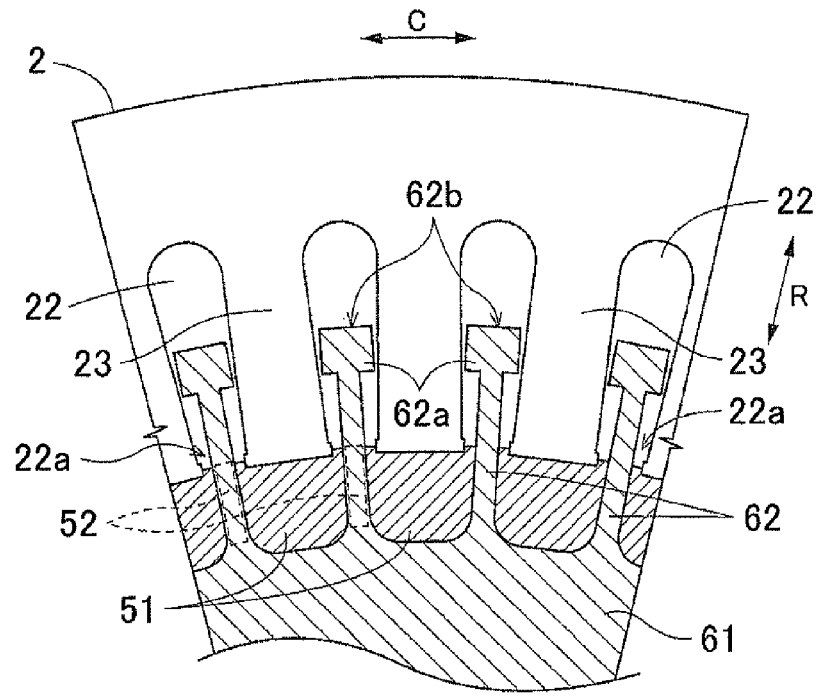
FIG. 4 is a sectional view taken along line IV-IV in FIG. 3.

The coil holding unit 50 is a member that holds the coil 3, and has blades 51. In the present embodiment, the coil holding unit 50 has as many blades 51 as the number of teeth 23 of the stator core 2. As shown in FIG. 4, the blades 51 are arranged along the circumferential direction C so as to face the teeth 23, respectively. As shown in FIG. 3, each blade 51 is formed in a bar shape so as to have a predetermined length (in this example, sufficiently greater than the axial length D4 of the stator core 2) in the axial direction L. Thus, the blades 51 are arranged in a cylindrical shape as a whole.

The lower end of each blade 51 is positioned and held by being fastened and fixed by a holding portion 54 of the coil holding unit 50. On the other hand, the upper end of each blade 51 is not positioned and held by using a special member. That is, the end of the coil holding unit 50 which is located on the axial first direction L1 side corresponds to the open ends of the blades 51, and the coil holding unit 50 has, on the axial second direction L2 side with respect to the open ends, the holding portion 54 that integrally holds the blades 51.

A hanging gap 52 (see FIG. 4, etc.) is formed between adjoining two of the blades 51 as a circumferential gap having a constant width in the circumferential direction C. In the present embodiment, the number of hanging gaps 52 is the same as that of slots 22 of the stator core 2. The hanging gaps 52 communicate with the inner peripheral openings 22a of the slots 22, respectively. As described below, a predetermined part of the annular conductor 35 forming the coil 3 is inserted and hung in each hanging gap 52. The coil holding unit 50 is capable of holding the coil 3 with the annular conductors 35 being hung in the hanging gaps 52.

The positioning unit 61 is a member that is fitted on the blades 51 to adjust the positional relation between the blades 51. The positioning unit 61 is formed in a disc shape having a predetermined thickness in the axial direction L. The outer shape of the disc-shaped portion conforms to the inner peripheral surfaces of the blades 51 arranged in the cylindrical shape. The positioning unit 61 is suspended from above the blades 51 (the upper side in FIG. 3), and is slidable along the axial direction L (along the extending direction of the blades 51) by a predetermined drive mechanism.

As shown in FIG. 4, the positioning unit 61 has, at its outer end in the radial direction R, projecting teeth 62 that project outward in the radial direction R in a radial pattern. Each projecting tooth 62 has the same shape, and is formed in a plate shape extending in the axial direction L and the radial direction R and having a predetermined width in the circumferential direction C. The number of projecting teeth 62 is the same as that of hanging gaps 52 of the coil holding unit 50. Each projecting tooth 62 is inserted in the hanging gap 52 with the positioning unit 61 being located below the open end of the coil holding unit 50 (the upper ends of the blades 51). Thus, the positioning unit 61 is capable of suppressing a variation in distance in the circumferential direction C between the blades 51 and adjusting the positional relation in the circumferential direction C therebetween.

With the positioning unit 61 being placed at the same position in the axial direction L as the stator core 2, each projecting tooth 62 extends between the blades 51 adjoining in the circumferential direction C, and projects toward the stator core 2 along the radial direction R. In the present embodiment, each projecting tooth 62 has such a length in the radial direction R that the distal end (in this example, the outer end in the radial direction R) of the projecting tooth 62 extends through the hanging gap 52 and beyond the inner peripheral opening 22a of the stator core 2 and enters the slot 22. The outer end in the radial direction R of each projecting tooth 62 is an expanded portion 62a that is formed so as to be expanded in the circumferential direction C as compared to a portion of the projecting tooth 62 which is located relatively inward in the radial direction R. An end face of the expanded portion 62a which faces outward in the radial direction R is a radial end race 62b of the projecting tooth 62. The radial end face 62b of each projecting tooth 62 is formed so as to extend to a position in the slot 22, which is located inward of the inner peripheral opening 22a of the slot 22 (toward the bottom of the slot 22; in this example, toward the outer side of the stator core 2 in the radial direction R).

As shown in FIG. 4, in the present embodiment, each expanded portion 62a is formed in a substantially rectangular shape as viewed in the axial direction L. Each of two side surfaces of the expanded portion 62a, which faces in the circumferential direction C, faces a side surface of the tooth 23 adjoining the expanded portion 62a, with a small gap therebetween. This small gap may correspond to a clearance to prevent, e.g., the expanded portion 62a from contacting the tooth 23. The radial end face 62b of the expanded portion 62a, which is a surface facing outward in the radial direction R, has a width in the circumferential direction C which corresponds to the width in the circumferential direction C of the slot 22. More specifically, the width in the circumferential direction C of the radial end face 62b is slightly smaller than the width in the circumferential direction C of the slot 22.

The radial end face 62b is placed so as to be located in the central portion of the slot 22 in the radial direction R. Moreover, in the present embodiment, the radial end face 62b is placed at a position in the radial direction R where an imaginary extended line of the radial end face 62b divides the area of a cross section perpendicular to the axial direction L of the slot 22 into two equal parts, as viewed in the axial direction L. Thus, the space in the slot 22 is divided into two spaces having approximately the same volume by the radial end face 62b.

Figure 5:
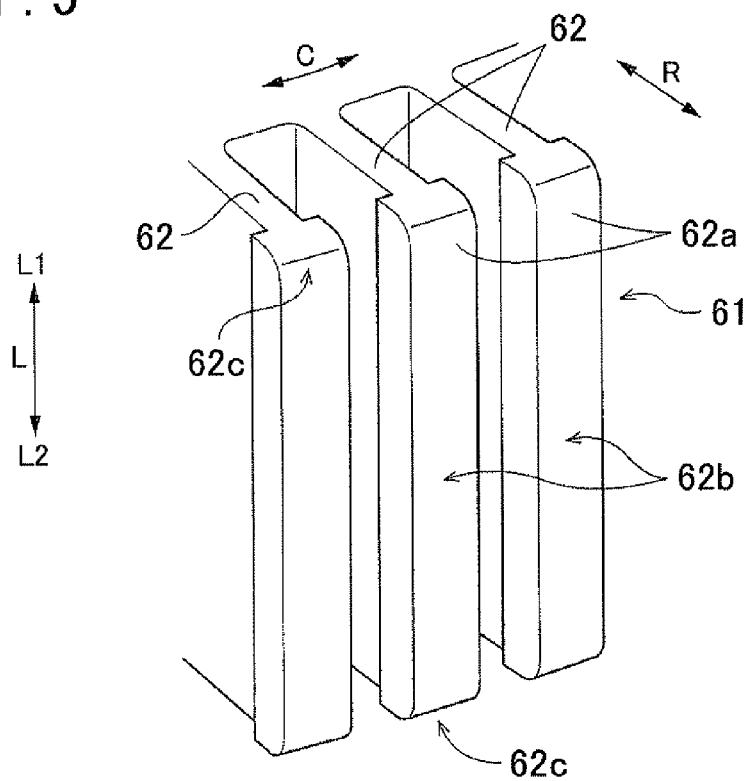
FIG. 5 is an enlarged perspective view of a positioning unit.

As shown in FIG. 5, each projecting tooth 62 has a tilted surface 62c at its end in the axial direction L. In the present embodiment, each projecting tooth 62 has tilted surfaces 62c at its both ends in the axial direction L. Each tilted surface 62c is formed so as to extend from the inner peripheral opening 22a of the slot 22 toward the inside of the slot 22 (toward the bottom of the slot 22; in this example, toward the outer side of the stator core 2 in the radial direction R) in the radial direction R as the tilted surface 62c extends from the end of the projecting tooth 62 in the axial direction L toward the central portion of the projecting tooth 62 in the axial direction L. Each tilted surface 62c is formed in the form of a surface that is uniformly curved in the circumferential direction C. Each tilted surface 62c is formed to have an arc shape in cross section so that the tangential direction in the cross section along the radial direction R gradually changes between a direction parallel to the axial direction L and a direction perpendicular to the axial direction L.

In the present embodiment, the coil holding unit 50 has as many blades 61 as the number of teeth 23 as described above, so that the coil insertion apparatus 5 can be applied to manufacturing of the spiral coil 3. Thus, the blades 51 have a very narrow width in the circumferential direction C. On the other hand, as shown in FIG. 3, since the blades 51 have a relatively large length in the axial direction L, the upper end of each blade 51 may not be accurately positioned by merely fastening and fixing the lower end of the blade 51 by the holding portion 54. Thus, the positional relation between the blades 51 is adjusted near the upper ends of the blades 51 as well by using the positioning unit 61, whereby the blades 51 can be accurately positioned even in the coil insertion apparatus 5 having the configuration described above.

The coil pushing-out unit 71 is a member that pushes out the coil 3 held in the coil holding unit 50 toward the slots 22 of the stator core 2. As shown in FIG. 3, the coil pushing-out unit 71 has a main body 71a and a protruding portion 71b. The main body 71a is formed in a disc shape having a predetermined width in the axial direction L. The outer shape of the main body 71a conforms to the inner peripheral surfaces of the blades 51 arranged in the cylindrical shape. The protruding portion 71b protrudes from the main body 71a toward the positioning unit 61 (upward) in the axial direction L. The protruding portion 71b is formed concentrically with the main body 71a and has a smaller diameter than the main body 71a. The coil pushing-out unit 71 is placed on a lower end side of the blades 51, and is placed on the opposite side from the stator core 2 in the axial direction L (the lower side in FIG. 3) with respect to the coil 3 (the annular conductors 35) held in the coil holding unit 50. The coil pushing-out unit 71 is coupled to a predetermined drive mechanism via a first drive shaft 74, and the coil pushing-out unit 71 is slidable along the axial direction L (along the extending direction of the blades 51) in response to operation of the drive mechanism.

Figure 6:
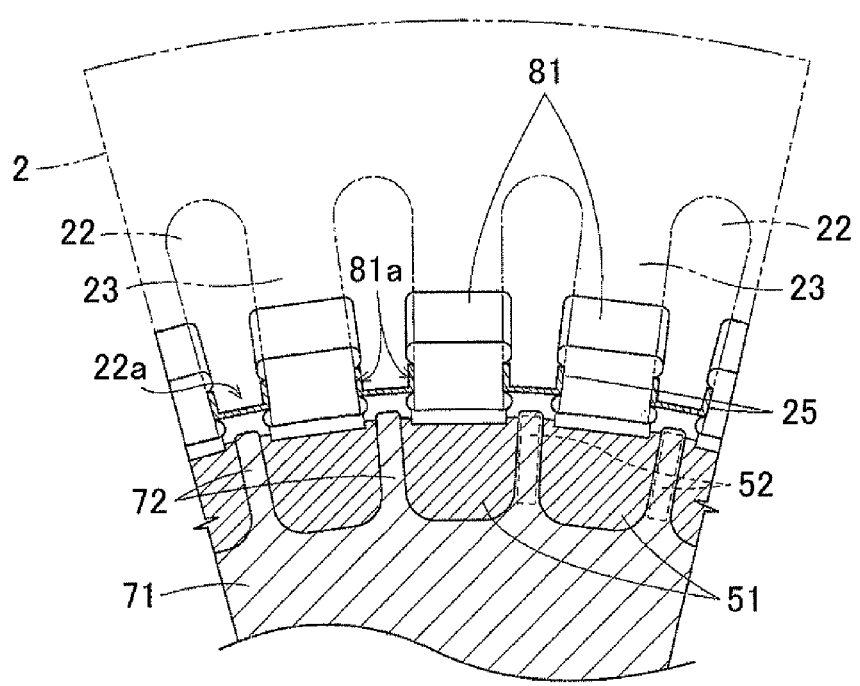
FIG. 6 is a sectional view taken along line VI-VI in FIG. 3.

As shown in FIG. 6, the coil pushing-out unit 71 has, at its outer end in the radial direction R, pushing-in teeth 72 that project outward in the radial direction R in a radial pattern. In FIG. 6, in order to clearly show the relative positional relation with the stator core 2, the stator core 2 that is placed at a different position in the axial direction L is shown by two-dot chain line. Each pushing-in tooth 72 has the same shape, and is formed in a plate shape extending in the axial direction L and the radial direction R and having a predetermined width in the circumferential direction C. In the present embodiment, unlike the projecting teeth 62, the pushing-in teeth 72 do not have a portion corresponding to the expanded portion 62a (see FIG. 4). The number of pushing-in teeth 72 is the same as that of hanging gaps 52 of the coil holding unit 50. The pushing-in teeth 72 are inserted into the hanging gaps 52, respectively. In the present embodiment, unlike the projecting teeth 62, the pushing-in teeth 72 have such a length in the radial direction R that the distal end of the pushing-in tooth 72 (in this example, the outer end in the radial direction R) extends through the hanging gap 52 to the inner peripheral opening 22a of the stator core 2.

The coil pushing-out unit 71 that moves toward the stator core 2 (upward in FIG. 3) along the axial direction L pushes up the annular conductors 35 held in the coil holding unit 50. At this time, each pushing-in tooth 72 pushes out both a part of each annular conductor 35 which has been inserted in the hanging gap 52 of the coil holding unit 50 and a peripheral part of the inserted part, outward in the radial direction R to insert these parts of the annular conductor 35 into a corresponding one of the slots 22.

The wedge guide member 81 is a member that guides the wedge 25 to a predetermined position in each slot 22 of the stator core 2. The wedge guide members 81 are placed outward of the respective blades 51 in the radial direction R so as to adjoin the blades 51 arranged in the cylindrical shape. The number of wedge guide members 81 is the same as that of blades 51 and that of teeth 23 of the stator core 2, and the wedge guide members 81 are placed at the same positions in the circumferential direction C as the blades 51 and the teeth 23. Each wedge guide member 81 is placed outward of the blade 51 in the radial direction R with a small gap therebetween. Each wedge guide member 81 is formed in a bar shape so as to have a predetermined length in the axial direction L. Thus, the wedge guide members 81 are arranged in a cylindrical shape as a whole. Each wedge guide member 81 is positioned and held with its lower end being fastened and fixed by a main body case (not shown).

As shown in FIG. 6, each wedge guide member 81 has guide grooves 81a on its both side surfaces in the circumferential direction C. The wedge 25, which is bent to have a U-shaped (an angular U-shaped) cross section in this example, is placed between adjoining two of the wedge guide members 81 (between two guide grooves 81a facing each other in the circumferential direction C). The upper end of each wedge guide member 81 contacts the lower end face of the stator core 2.

The wedge pushing-up unit 82 is a member that pushes up the wedges 25 along the wedge guide members 81 (the guide grooves 81a). The wedge pushing-up unit 82 is coupled to a predetermined drive mechanism via a second drive shaft 84, and is slidable along the axial direction L (along the extending direction of the blades 51) in response to operation of the drive mechanism. The positioning unit 61, the coil pushing-out unit 71, and the wedge pushing-up unit 82 are configured to be slidable independently. After the coil 3 is inserted into the slots 22 by the coil pushing-out unit 71, the wedge pushing-up unit 82 pushes up the wedges 25 to close the inner peripheral openings 22a with the wedges 25, respectively.

3. Method of Manufacturing a Stator

Figure 7:
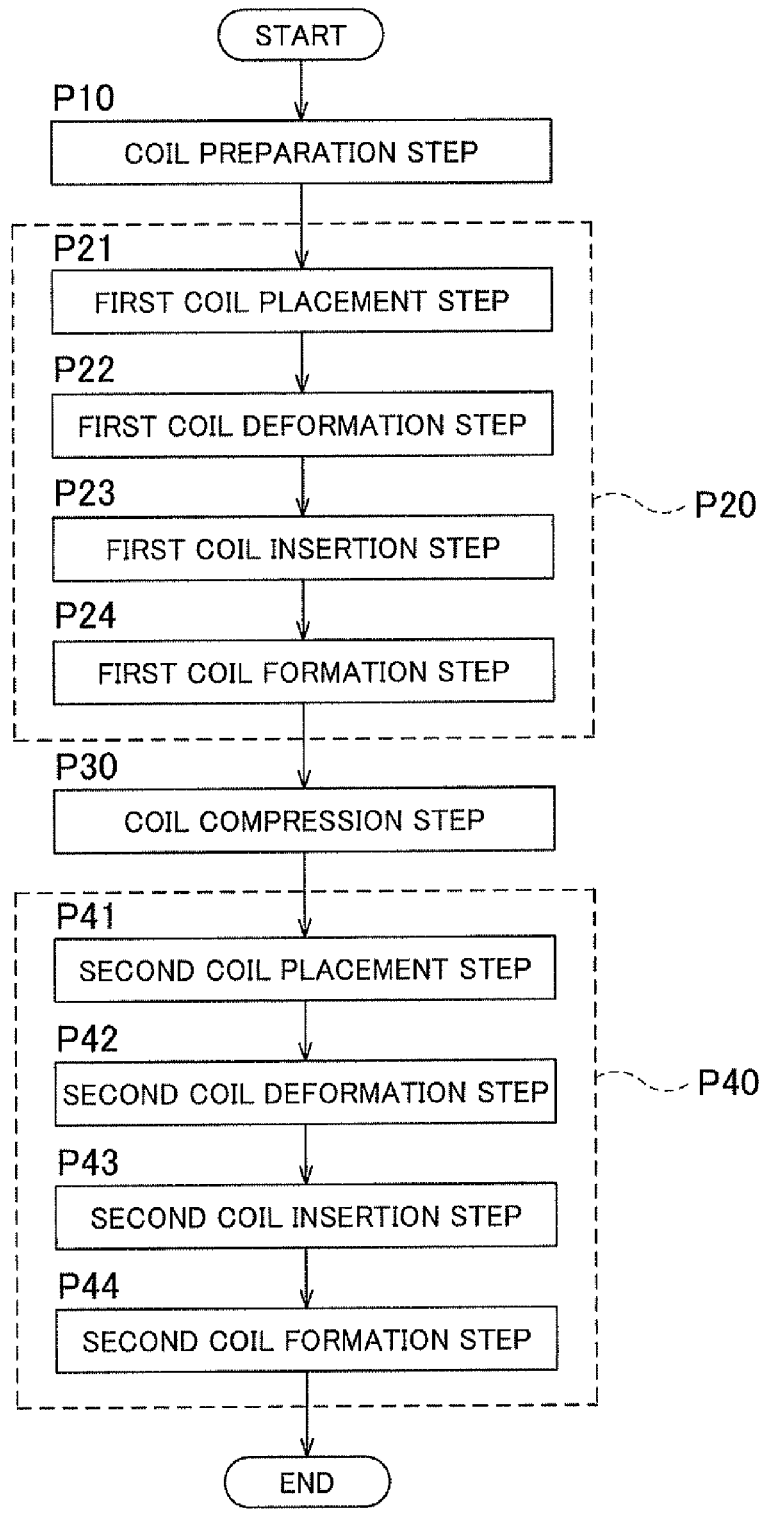
FIG. 7 is a flowchart illustrating a manufacturing process of a method of manufacturing a stator according to the embodiment.

Manufacturing of the stator 1 according to the present embodiment, which is performed by using the coil insertion apparatus 5 described above, will be described with reference to FIGS. 7 to 17. As shown in FIG. 7, the stator 1 according to the present embodiment is manufactured through a coil preparation step P10, a first coil winding step P20, a coil compression step P30, and a second coil winding step P40. In the present embodiment, these steps P10 to P40 are performed in this order. These steps will be described below in order.

3-1. Coil Preparation Step

The coil preparation step P10 is the step of preparing the annular conductors 35 forming the coil 3. In the present embodiment, the annular conductors 35 are formed by using a winding apparatus (not shown) separate from the coil insertion apparatus 5. Specifically, a set of three linear conductors 34 is wound a plurality of times around a spool included in the winding apparatus to form the annular conductor 35 formed as a bundle of the plurality of linear conductors 34 (see FIG. 1). The annular conductors 35 are formed as many as the number of slots 22 of the stator core 2 in this example. Half of the annular conductors 35 thus prepared are provided to the first coil winding step P20, and the other half are provided to the second coil winding step P40.

3-2. First Coil Winding Step

The first coil winding step P20 is the step of winding the first coil portion 3a of the coil 3 on the stator core 2. In the first coil winding step P20, the annular conductors 35 forming the first coil portion 3a are placed in the coil holding unit 50, and in this state, are inserted into the slots 22 by the coil pushing-out unit 71. The first coil winding step P20 has a first coil placement step P21, a first coil deformation step P22, a first coil insertion step P23, and a first coil formation step P24. These steps P21 to P24 are performed in this order.

3-2-1. First Coil Placement Step

The first coil placement step P21 is the step of placing the annular conductors 35 of the first coil portion 3a in the coil holding unit 50. The first coil placement step P21 is performed in the state where the positioning unit 61 is located at a position on the axial first direction L1 side, which is located above the open end of the coil holding unit 50 (the upper ends of the blades 51), and the stator core 2 has not been mounted on the coil insertion apparatus 5. Each of the coil pushing-out unit 71 and the wedge pushing-up unit 82 is located on the axial second direction L2 side, which is a lower end side of its slidable range.

In the first coil placement step P21, each of the annular conductors 35 is inserted in the axial direction L so as to be hung in predetermined two of the hanging gaps 52 of the coil holding unit 50. FIG. 8 is a diagram schematically showing the state where the annular conductors 35 are placed in the coil holding unit 50, as viewed in the radial direction R. As shown in the figure, each annular conductor 35 is placed so as to be hung in two hanging gaps 52 located five pitches (in this example, corresponding to five slot pitches) away from each other. At this time, each annular conductor 35 is placed such that the extending direction of a portion of the linear conductors 34 of the annular conductor 35, which connects the two hanging gaps 52 (a joint portion 35c described below), is tilted with respect to the axial direction L (the extending direction of the blades 51).

Placement of the annular conductors 35 will be more specifically described with reference to a specific one of the annular conductors 35 in FIG. 8 (hereinafter referred to as the "specific annular conductor 35A"). First, a first portion 35a as a part of the specific annular conductor 35A is inserted into one of the hanging gaps 52 formed between the blades 51 (a first hanging gap 52a) from the open end side of the coil holding unit 50. The first portion 35a is further inserted toward the lower part of the first hanging gap 52a along the blades 51. The first portion 35a is placed so as to be located near the upper end face of the main body 71a of the coil pushing-out unit 71.

Next, a second portion 35b as another part of the specific annular conductor 35A is inserted into a second hanging gap 52b, which is located five pitches away from the first hanging gap 52a, from the open end side of the coil holding unit 50. The second portion 35b is inserted along the blades 51, but is placed so as to be located on the axial first direction L1 side (in this example, the upper side in FIG. 8) with respect to the first portion 35a of the specific annular conductor 35A. The joint portion 35c connecting the first portion 35a and the second portion 35b is placed so as to be tilted with respect to the axial direction L.

A first portion 35a of another one of the annular conductors 35 which is different from the specific annular conductor 35A (hereinafter referred to as the "specific annular conductor 35B") is inserted into the hanging gap 52 (a first hanging gap 52a') located two pitches away from the first hanging gap 52a in the direction opposite to the second hanging gap 52b, and a second portion 35b of the specific annular conductor 35B is inserted into the hanging gap 52 (a second hanging gap 52b') located two pitches away from the second hanging gap 52b. A joint portion 35c connecting the first portion 35a and the second portion 35b of the specific annular conductor 35B is placed so as to be tilted with respect to the axial direction L. This operation is sequentially performed along the entire circumference of the stator core 2.

The first portions 35a of the last annular conductor 35 to be inserted and the second last annular conductor 35 to be inserted are inserted so as to be placed below the second portion 35b of the specific annular conductor 35A and the second portion 35b of the specific annular conductor 3513 in the state where the second portions 35b of the specific annular conductors 35A, 35B are separated from the respective second hanging gaps 52b, 52b' and located above the open end of the coil holding unit 50. Then, the second portion 35b of the specific annular conductor 35A and the second portion 35b of the specific annular conductor 35B are returned to predetermined positions in the second hanging gaps 52b, 52b', respectively.

With the annular conductors 35 being placed in the coil holding unit 50 in this manner, the joint portions 35c connecting the first and second portions 35a, 35b of the respective annular conductors 35 are placed so as to extend from the axial first direction L1 side toward the axial second direction L2 side from one side in the circumferential direction C (in this example, the right side in FIG. 8) toward the other side in the circumferential direction C (in this example, the left side in FIG. 8). Every two joint portions 35c adjoining each other in the circumferential direction C are placed so as to partially overlap each other as viewed in the axial direction L. The joint portion 35c of each annular conductor 35 is placed so as to extend on the axial first direction L1 side with respect to the first portion 35a of any other of the annular conductors 35 which is positioned so as to overlap this joint portion 35c as viewed in the axial direction L. The second portion 35b of each annular conductor 35 is placed so as to extend on the axial first direction L1 side with respect to each first portion 35a and the joint portion 35c of any other of the annular conductors 35 which is positioned so as to overlap this second portion 35b as viewed in the axial direction L. The overall length D2 in the axial direction L of the annular conductors 35 (along the blades 51) upon completion of the first coil placement step P21 is equal to the length by which the lower end of the first portion 35a is separated from the upper end of the second portion 35b along the axial direction L. In this example, the annular conductors 35 forming the first coil portion 3a of all the three phases are collectively placed in the coil holding unit 50.

The coil holding unit 50 holding the annular conductors 35 therein is provided to the first coil deformation step P22. The stator core 2 is mounted at a predetermined position on the coil insertion apparatus 5 between the first coil placement step P21 and the first coil deformation step P22. The positioning unit 61 is moved along the axial direction L from the position on the axial direction L1 side, which is located above the coil holding unit 50, downward toward the axial second direction L2 side to the position where the lower end of the positioning unit 61 is aligned with the lower end of the stator core 2.

3-2-2. First Coil Deformation Step

Figure 10:
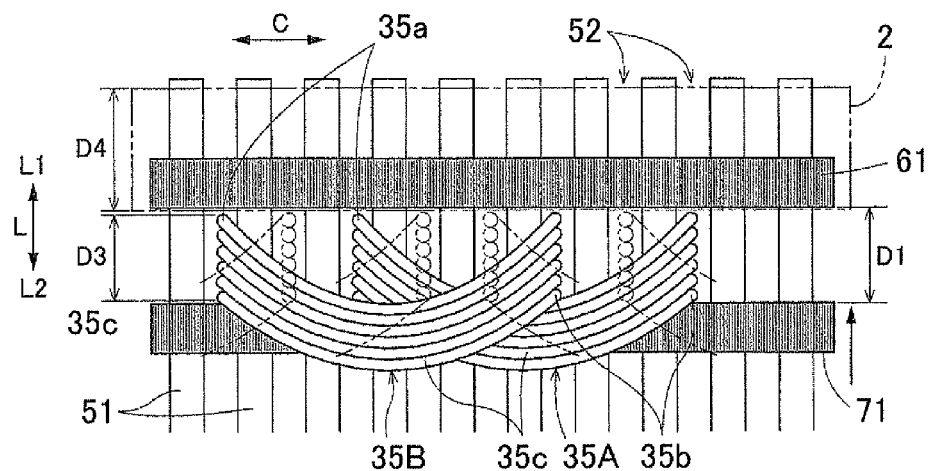
FIG. 10 is a schematic diagram showing the state where the annular conductors are placed in the first coil deformation step.

The first coil deformation step P22 is the step of deforming the joint portions 35c of the annular conductors 35. As shown in FIGS. 9 and 10, the first coil deformation step P22 is performed in the state where the position of the positioning unit 61 in the axial direction L is fixed with respect to the coil holding unit 50. In the present embodiment, the joint portions 35c of the annular conductors 35 are deformed by moving the coil pushing-out unit 71 upward along the blades 51 (along the axial direction L) to a predetermined set position Ps, with the absolute positions of both the coil holding unit 50 and the positioning unit 61 being fixed. In this example, all the joint portions 35c of the annular conductors 35 forming the first coil portion 3a of the three phases are collectively deformed.

The predetermined set position Ps is set to a position on the axial second direction L2 side, which is located at least below the lower end face of the stator core 2 in the state where the stator core 2 is mounted on the coil insertion apparatus 5. The set position Ps is also set to a position where the axial interval D1 between the positioning unit 61 and the coil pushing-out unit 71 is shorter than the overall length D2 of the annular conductors 35 in the axial direction L before deformation (see FIG. 8). As shown in FIG. 9, the coil pushing-out unit 71 has the protruding portion 71b that protrudes from the main body 71a toward the stator core 2 (toward the positioning unit 61) in the axial direction L. However, the protruding portion 71b is not considered when the axial interval D1 between the positioning unit 61 and the coil pushing-out unit 71 is defined. That is, in the present embodiment, the axial interval D1 is the length by which the lower end of the positioning unit 61 is separated from the upper end of the main body 71a of the coil pushing-out unit 71 along the axial direction L.

By moving the coil pushing-out unit 71 to the set position Ps that is set as described above, the joint portion 35c of each annular conductor 35 is pressed and deformed between the lower end face of the positioning unit 61 and the upper end face of the main body 71a of the coil pushing-out unit 71. That is, the coil pushing-out unit 71 (more precisely, the main body 71a) sequentially pushes up and deforms the joint portions 35c of the respective annular conductors 35, which are placed on the inner peripheral surface side of the coil holding unit 50 (the blades 51), from the lower end side of the joint portions 35c. As the joint portions 35c are pushed up, the first portions 35a of the annular conductors 35 are pushed up in the respective hanging gaps 52. At this time, the wedge pushing-up unit 82 remains at its original position, and the wedges 25 also remain at their original positions.

The set position Ps can be set to the position where the axial interval D1 between the positioning unit 61 and the coil pushing-out unit 71 is, e.g., ½ or less or ⅓ or less of the overall length D2 of the annular conductors 35 in the axial direction L before deformation. Moreover, in the present embodiment, the set position Ps is set to the position where the axial interval D1 between the positioning unit 61 and the coil pushing-out unit 71 matches the length (referred to as the "dense-state length") D3 of the first portion 35a or the second portion 35b along the axial direction L in the state where the plurality of linear conductors 34 is arranged with no gap therebetween in the hanging gaps 52 (see FIG. 10). The coil pushing-out unit 71 pushes up the first portion 35a of each annular conductor 35 to a position in the axial direction L which corresponds to the position of the second portion 35b. Thus, the coil pushing-out unit 71 deforms joint portions 35c so as to reduce the region in the axial direction L which is occupied by the joint portions 35c connecting the first and second portions 35a, 35b. Thus, the shape of the joint portion 35c of each annular conductor 35 can be changed to a shape close to that of the coil end portion 32 (the link portions 31) of the first coil portion 3a after the annular conductor 35 is wound on the stator core 2. In FIG. 10, in order to improve visual recognition, a part of the joint portions 35c is shown to hang down below the upper end face of the coil pushing-out unit 71.

At this time, in the present embodiment, the joint portion 35c of each annular conductor 35 contacts and is supported by the outer peripheral surface of the protruding portion 71b of the coil pushing-out unit 71, and is deformed as described above in the state where inward movement (deformation) of the annular conductor 35 in the radial direction R is restricted by this outer peripheral surface as the contact surface. That is, with the coil pushing-out unit 71 being moved to the set position Ps, the coil pushing-out unit 71, the positioning unit 61, and the blades 51 operate cooperatively with each other to function as a mold that presses the joint portions 35c therein. Each joint portion 35c is pressed by the main body 71a, the positioning unit 61, the protruding portion 71b, and the blades 51 within an annular space defined by the upper end face of the main body 71a, the lower end face of the positioning unit 61, the outer peripheral surface of the protruding portion 71b, and the inner peripheral surfaces of the blades 51. This can reduce the apparent volume of the joint portions 35c, and can increase the space density thereof. In particular, since the joint portions 35c are deformed so that the length thereof in the axial direction L matches the dense-state length D3, the space density of the joint portions 35c can be maximized. Moreover, in the completed stator 1, the coil end portions 32 on both sides in the axial direction L can be more appropriately balanced in size. Thus, the ratio of the outer diameter of the protruding portion 71b to the outer diameter of the main body 71a is set in view of the above. For example, it is preferable to set this ratio so that the volume of the annular space matches the volume corresponding to the desired size of the coil end portions 32. The first coil insertion step P23 is performed after deforming the joint portions 35c of the annular conductors 35 in this manner.

The set position Ps is set to the position where the axial interval D1 between the positioning unit 61 and the coil pushing-out unit 71 is shorter than the axial length D4 of the stator core 2. In the present embodiment, the dense-state length D3 of the first portion 35a or the second portion 35b is essentially set to a length shorter than the axial length D4 of the stator core 2. Accordingly, in the present embodiment, the axial interval D1 between the positioning unit 61 and the coil pushing-out unit 71 is also shorter than the axial length D4 of the stator core 2.

3-2-3. First Coil Insertion Step

Figure 11:
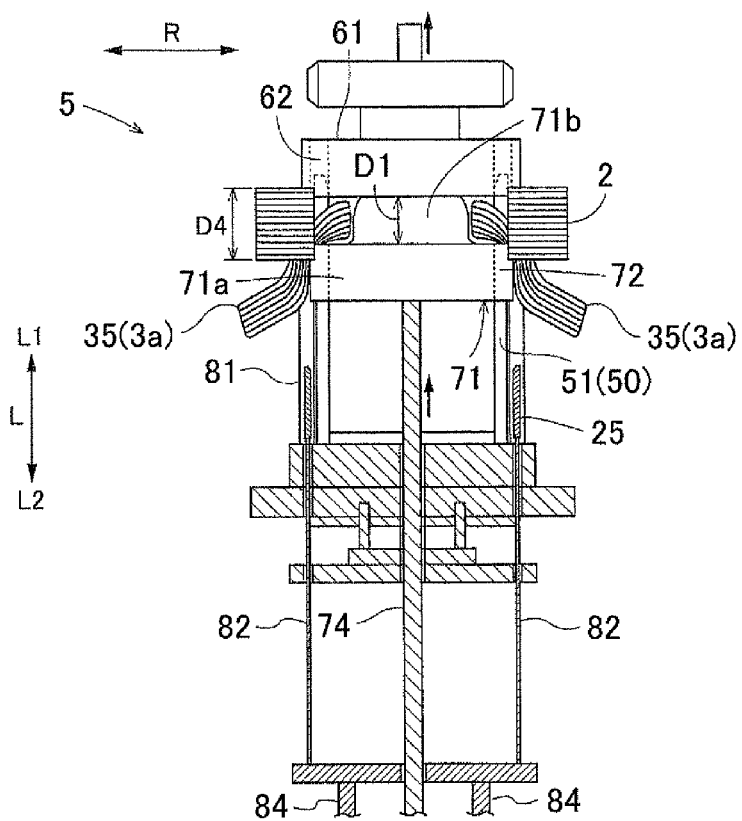
FIG. 11 is a diagram showing the state of the coil insertion apparatus in one phase of a first coil insertion step.
Figure 12:
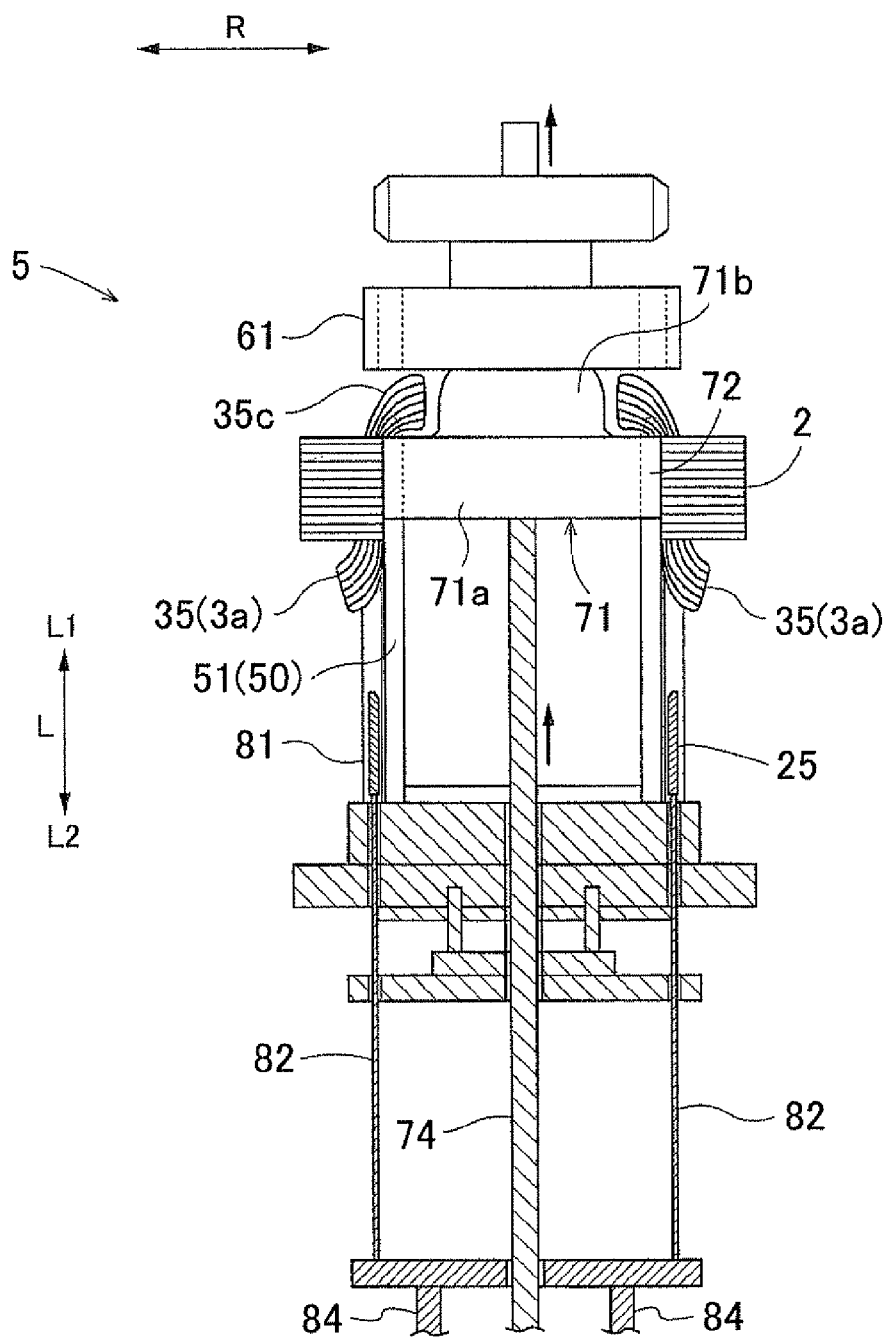
FIG. 12 is a diagram showing the state of the coil insertion apparatus in the final phase of the first coil insertion step.

The first coil insertion step P23 is the step of inserting the first portions 35a and the second portions 35b of the annular conductors 35 into the slots 22. As shown in FIGS. 11 and 12, in the first coil insertion step P23, the first portions 35a and the second portions 35b are inserted into the slots 22 by moving the coil pushing-out unit 71 further upward along the axial direction L.

In the first coil insertion step P23, the positioning unit 61 is moved in the axial direction L according to (in synchronization with) the movement of the coil pushing-out unit 71 in the axial direction L. In the present embodiment, the axial interval D1 between the positioning unit 61 and the coil pushing-out unit 71 is set so as to match the dense-state length D3 in the state where the protruding portion 71b of the coil pushing-out unit 71 is fitted on the positioning unit 61. In this state, the coil pushing-out unit 71 and the positioning unit 61 are moved in the axial direction L. Thus, the axial interval D1 between the positioning unit 61 and the coil pushing-out unit 71 is maintained at the dense-state length D3. Since the positioning unit 61 and the coil pushing-out unit 71 are moved while maintaining such a relative positional relation therebetween, the joint portions 35c deformed in the first coil deformation step P22 can be moved as they are in the axial direction L without causing further deformation thereof. Thus, the joint portions 35c can be moved in the axial direction L while undesired deformation of the joint portions 35c due to an unnecessary stress applied thereto is suppressed.

FIG. 11 shows one phase during the first coil insertion process P23. As described above, in the present embodiment, the axial interval D1 between the positioning unit 61 and the coil pushing-out unit 71 is shorter than the axial length D4 of the stator core 2. Accordingly, as can be seen from FIG. 11, the first coil insertion step P23 is performed through the state where both the projecting teeth 62 of the positioning unit 61 and the pushing-in teeth 72 of the coil pushing-out unit 71 extend through the hanging gaps 52 and are placed in the inner peripheral openings 22a of the slots 22. That is, the first coil insertion step P23 is performed such that at least one of the projecting teeth 62 of the positioning unit 61 and the pushing-in teeth 72 of the coil pushing-out unit 71 extend through the hanging gaps 52 and are placed in the inner peripheral openings 22a of the slots 22 throughout the step. Accordingly, the first coil insertion step P23 can be performed while the relative positional relation between the hanging gaps 52 and the slots 22 is appropriately maintained. This is particularly effective in the coil insertion apparatus 5 according to the present embodiment in which the positions of the open ends of the blades 51 are not easily accurately fixed in the first coil insertion step P23 as described above.

FIG. 12 shows the final phase of the first coil insertion step P23. As shown in the figure, in the first coil insertion step P23, the coil pushing-out unit 71 is moved upward along the axial direction L eventually to the position where the upper end of the main body 71a is aligned with the upper end of the stator core 2 in this example. Thus, the joint portions 35c of the respective annular conductors 35 after deformation are positioned so as to project from the stator core 2 in the axial direction L. In this state, the positioning unit 61 is located above the upper ends of the blades 51, and is located on the axial first direction L1 side with respect to the coil holding unit 50. In this stage, the joint portions 35c are still located inward of the blades 51 in the radial direction R. The joint portions 35c eventually serve as the link portions 31 forming the spiral coil end portion 32 of the first coil portion 3a. The joint portions 35c are positioned so as to project from the stator core 2 in the axial direction L, and at the same time, the first portions 35a, the second portions 35b, and the peripheral portions thereof in the annular conductors 35 are inserted into the slots 22.

In this example, all the joint portions 35c of the annular conductors 35 forming the first coil portion 3a of the three phases are collectively positioned so as to protrude from the stator core 2 in the axial direction L, and all of the first portions 35a, the second portions 35b, and the peripheral portions thereof for the three phases are collectively inserted into the slots 22.

In the present embodiment, in the first coil deformation step P22, the joint portions 35c of the annular conductors 35 have already been deformed into the shape close to that of the coil end portion 32 of the first coil portion 3a after the annular conductors 35 are wound on the stator core 2. This facilitates insertion of the annular conductors 35 into the slots 22 in the subsequent first coil insertion step P23. At this time, a variation in size between the coil end portions 32 on both sides in the axial direction L is reduced, and these coil end portions 32 are appropriately balanced in size, whereby the occurrence of an event in which the annular conductors 35 are caught, etc. can be effectively suppressed, and the annular conductors 35 can be easily inserted into the slots 22. Since the space density of the joint portions 35c is increased, the size of the coil end portions 32 in the completed stator 1 can be reduced as compared to conventional examples. Since the first coil insertion step P23 can be performed while the relative positional relation between the hanging gaps 52 and the slots 22 is appropriately maintained, the first portions 35a and the second portions 35b of the annular conductors 35 can be reliably inserted into the slots 22.

3-2-4. First Coil Formation Step

Figure 13:
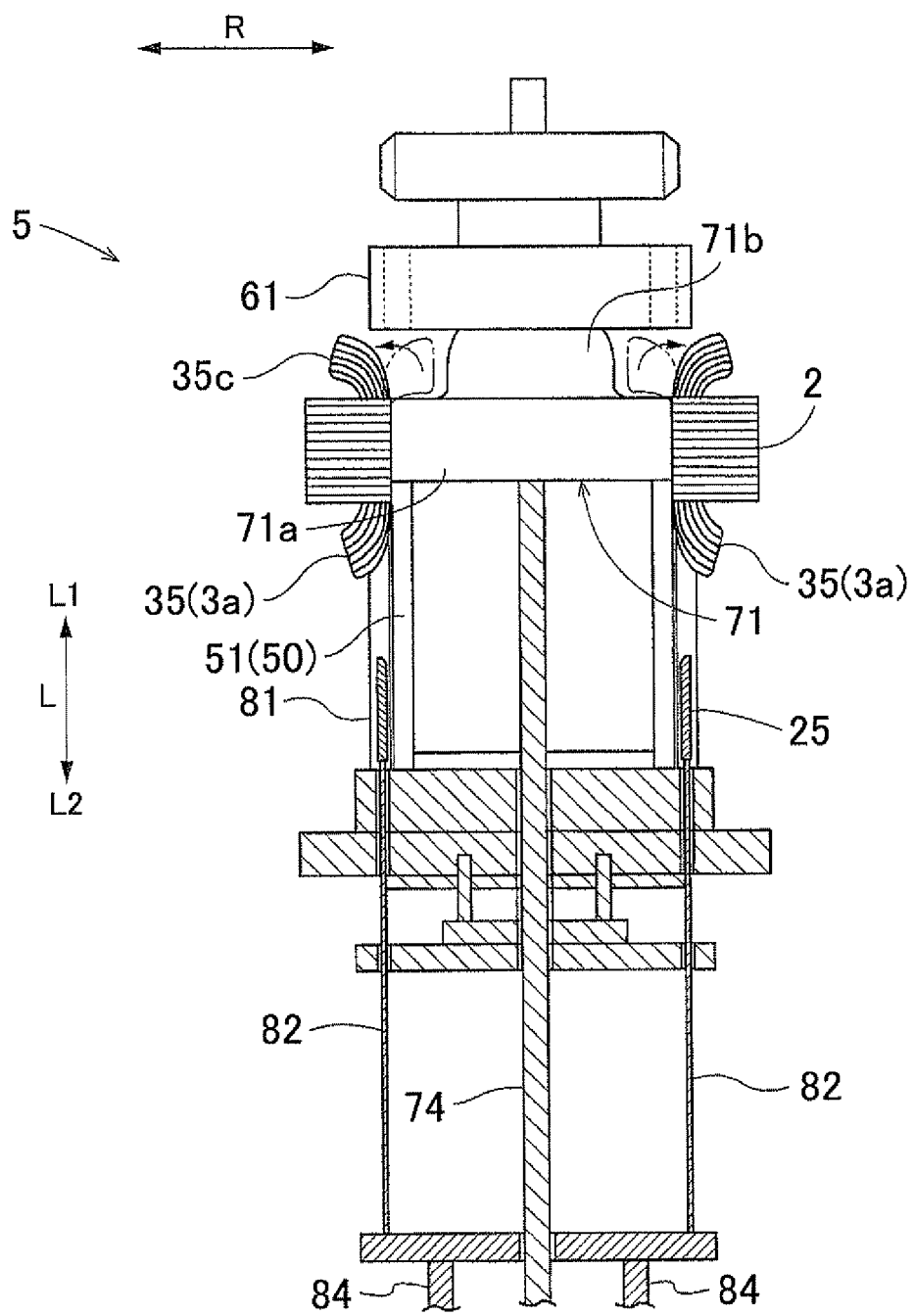
FIG. 13 is a diagram showing the state of the coil insertion apparatus in a first coil formation step.

The first coil formation step P24 is the step of forming the joint portions 35c of the annular conductors 35 inserted in the slots 22. As shown in FIG. 13, in the first coil formation step P24, the joint portions 35c are deformed so as to be pushed outward in the radial direction R by using a predetermined forming jig (not shown). Thus, the spiral coil end portion 32 as shown in FIG. 1 is formed in the first coil portion 3a.

3-3. Coil Compression Step

The coil compression step P30 is the step of compressing the portion, which is located in the slots 22, of the first coil portion 3a that has been wound on the stator core 2 in the first coil winding step P20, and the portion is compressed in the radial direction R. In the present embodiment, after the first coil winding step P20, the coil compression step P30 is performed in the state where the stator core 2 having the first coil portion 3a wound thereon is detached from the coil insertion apparatus 5 and is mounted on another apparatus (schematically shown by chain line in FIG. 14) different from the coil insertion apparatus 5. At this time, in the present embodiment, the positioning unit 61 is also moved according to the stator core 2.

Figure 14:
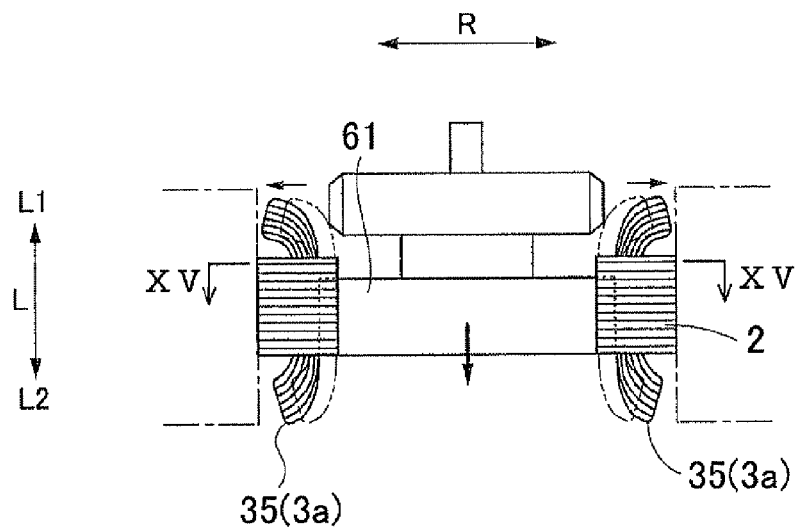
FIG. 14 is a diagram showing the state of a stator core and the positioning unit in a coil compression step.
Figure 15:
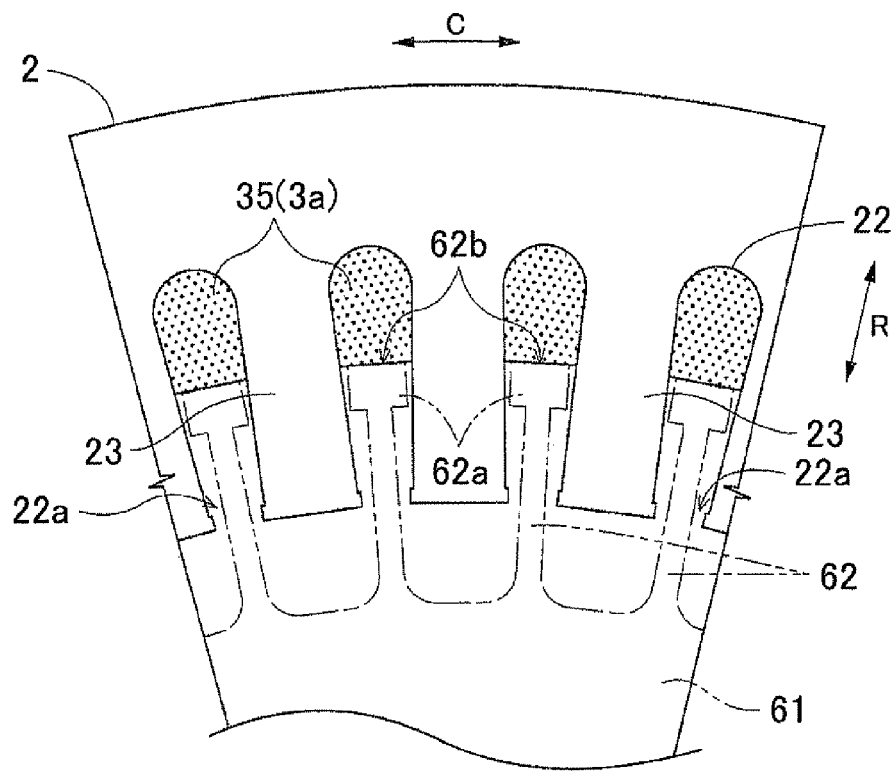
FIG. 15 is a sectional view taken along line XV-XV in FIG. 14.

As shown in FIG. 14, in the coil compression step P30, with the stator core 2 being fixed, the positioning unit 61 is moved in the axial direction L at least between the end of the stator core 2 on the axial first direction L1 side and the end of the stator core 2 on the axial second direction L2 side. In the present embodiment, the positioning unit 61 is moved in the axial direction L toward the axial second direction L2 side from the position where the lower end of the positioning unit 61 is located above the upper end of the stator core 2 to the position where the lower end of the positioning unit 61 is aligned with the lower end of the stator core 2. In this manner, the positioning unit 61 is moved along the entire length of the stator core 2 in the axial direction L. The stator core 2 may be moved in the axial direction L with the positioning unit 61 being fixed.

As described above, each projecting tooth 62 of the positioning unit 61 has the expanded portion 62a at its outer end in the radial direction R. The radial end face 62b of the projecting tooth 62 (the expanded portion 62a) has a width in the circumferential direction C which corresponds to the width in the circumferential direction C of the slot 22, and is placed so as to be located in the central portion of the slot 22 in the radial direction R. Accordingly, in the coil compression step P30, the positioning unit 61 is moved along the entire length of the stator core 2 in the axial direction L, whereby the part of the first coil portion 3a, which is located in each slot 22, can be pushed out by the radial end face 62b of each projecting tooth 62 from the inner peripheral opening 22a of the slot 22 toward the inside of the slot 22 (toward the bottom of the slot 22; in this example, outward in the radial direction R) (see FIG. 15). Thus, this part of the first coil portion 3a can be compressed in the radial direction R within each slot 22. This can increase the density of the first coil portion 3a in each slot 22, and can increase the space factor thereof.

Moreover, a space for placing the second coil portion 3b can be created on an inner peripheral opening 22a side of the slot 22 in each slot 22, namely inward of the radial end face 62b in the radial direction R. At this time, the space for placing the second coil portion 3b can be created as a space having a volume similar to that in which the first coil portion 3a is placed. This allows the first coil portion 3a and the second coil portion 3b, which are eventually placed so as to adjoin each other in the radial direction R, to be evenly arranged in each slot 22. Moreover, this can also suppress friction between the annular conductors 35 of the first coil portion 3a and the second coil portion 3b, etc. when the annular conductors 35 of the second coil portion 3b are inserted into the slots 22 in the subsequent second coil insertion step P43, and can suppress damage to the coil 3.

In this case, in the present embodiment, each projecting tooth 62 has the tilted surface 62c at least at its end on the second axial direction L2 side (see FIG. 5). This allows a predetermined part of the annular conductors 35 of the first coil portion 3a to be smoothly pushed out into the slots 22 along the tilted surfaces 62c as the positioning unit 61 is moved toward the second axial direction L2 side. Since the end in the axial direction L of each projecting tooth 62 is rounded due to the tilted surface 62c, damage to the annular conductors 35 of the first coil portion 3a can also be effectively suppressed when this end contacts the conductors forming the coil 3.

3-4. Second Coil Winding Step

The second coil winding step P40 is the step of winding the second coil portion 3b of the coil 3 on the stator core 2. In the second coil winding step P40, the annular conductors 35 forming the second coil portion 3b are placed in the coil holding unit 50, and in this state, are inserted into the slots 22 by the coil pushing-out unit 71. At this time, the annular conductors 35 of the second coil portion 3b are placed inward, in the radial direction R, of the annular conductors 35 of the first coil portion 3a which have already been wound on the stator core 2 in the first coil winding step P20, namely on the inner peripheral opening 22b side with respect to the annular conductors 35 of the first coil portion 3a. The second coil winding step P40 has a second coil placement step P41, a second coil deformation step P42, a second coil insertion step P43, and a second coil formation step P44. These steps P41 to P44 are performed in this order.

The contents of the individual steps P41 to P44 of the second coil winding step P40 are basically similar to those of the steps P21 to P24 of the first coil winding step P20. Accordingly, detailed description of the steps P41 to P44 will be omitted.

Figure 16:
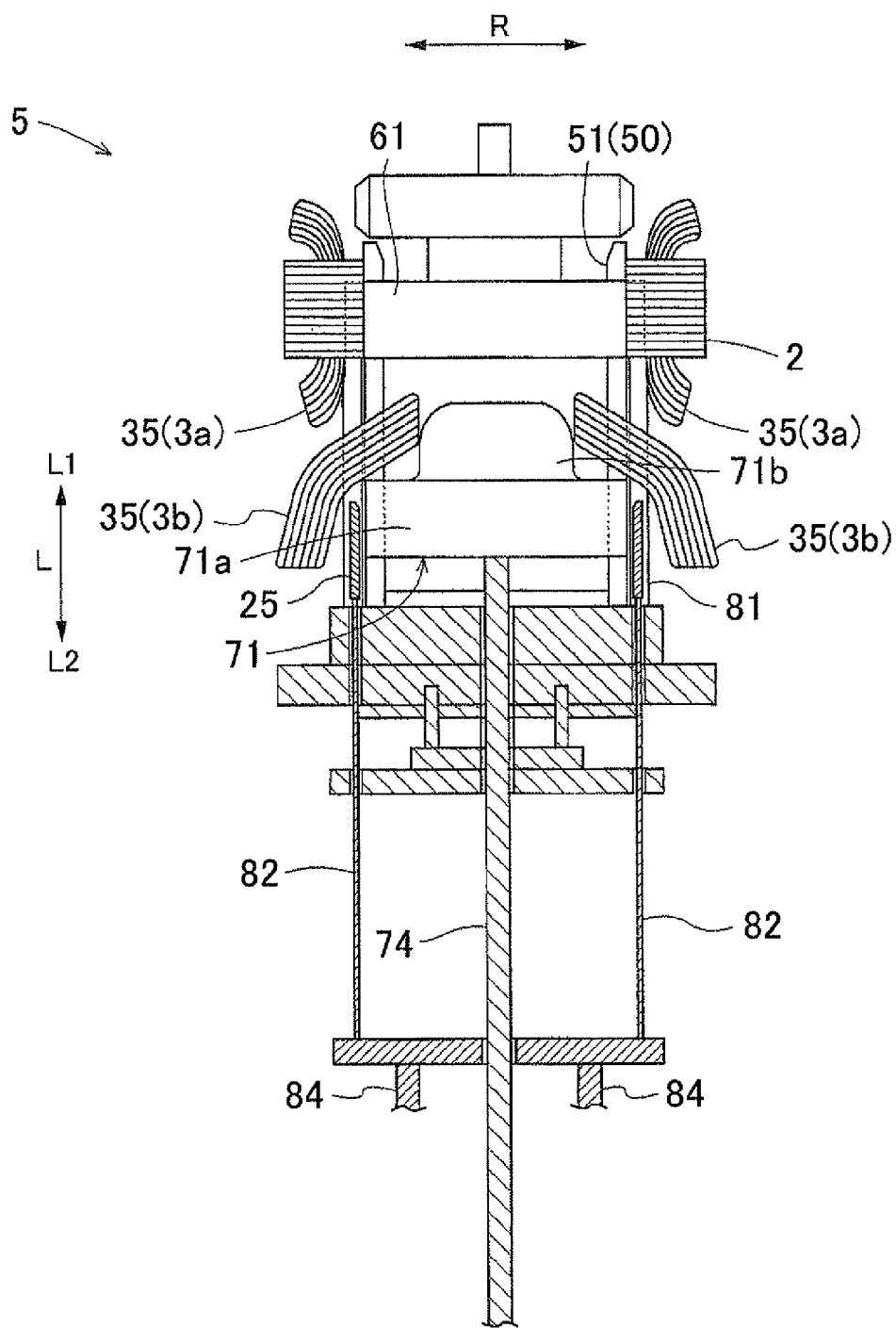
FIG. 16 is a diagram showing the state of the coil insertion apparatus in a second coil placement step.

The stator core 2 and the positioning unit 61 after execution of the coil compression step P30 are mounted at a predetermined position on the coil insertion apparatus 5 between the second coil placement step P41 and the second coil deformation step P42 (see FIG. 16). In the present embodiment, the positioning unit 61 is first mounted on the coil insertion apparatus 5, and then the stator core 2 is mounted on the coil insertion apparatus 5. However, the stator core 2 and the positioning unit 61 after execution of the coil compression step P30 may be simultaneously mounted on the coil insertion apparatus 5. In this state, the position of the lower end of the positioning unit 61 is aligned with that of the lower end of stator core 2. This allows the subsequent second coil deformation step P42 to be performed smoothly.

In the present embodiment, in the subsequent second coil insertion step P43, the positioning unit 61 is moved in the axial direction L in synchronization with movement of the coil pushing-out unit 71 in the axial direction L. Specifically, the positioning unit 61 is moved along the axial direction L toward the axial first direction L1 side from the position where the lower end of the positioning unit 61 is aligned with the lower end of the stator core 2 (see FIG. 16) to the position where the lower end of the positioning unit 61 is located above the upper end of the stator core 2. In this manner, the positioning unit 61 is moved along the entire length in the axial direction L of the stator core 2. Thus, a part of the first coil portion 3a, which is located in the slots 22, can be pressed by the radial end face 62b of each projecting tooth 62 in a direction from the inner peripheral opening 22a of the slot 22 toward the inside of the slot 22. In this case, in particular, the first coil portion 3a, which may be expanded to some degree due to elasticity after being compressed in the coil compression step P30, can be pressed and recompressed in the radial direction R by the radial end faces 62b. At this time, since each projecting tooth 62 has the tilted surface 62c at the end on the first axial direction L1 side as well, damage to the annular conductors 35 of the first coil portion 3a can be effectively suppressed during the recompression as well.

Figure 17:
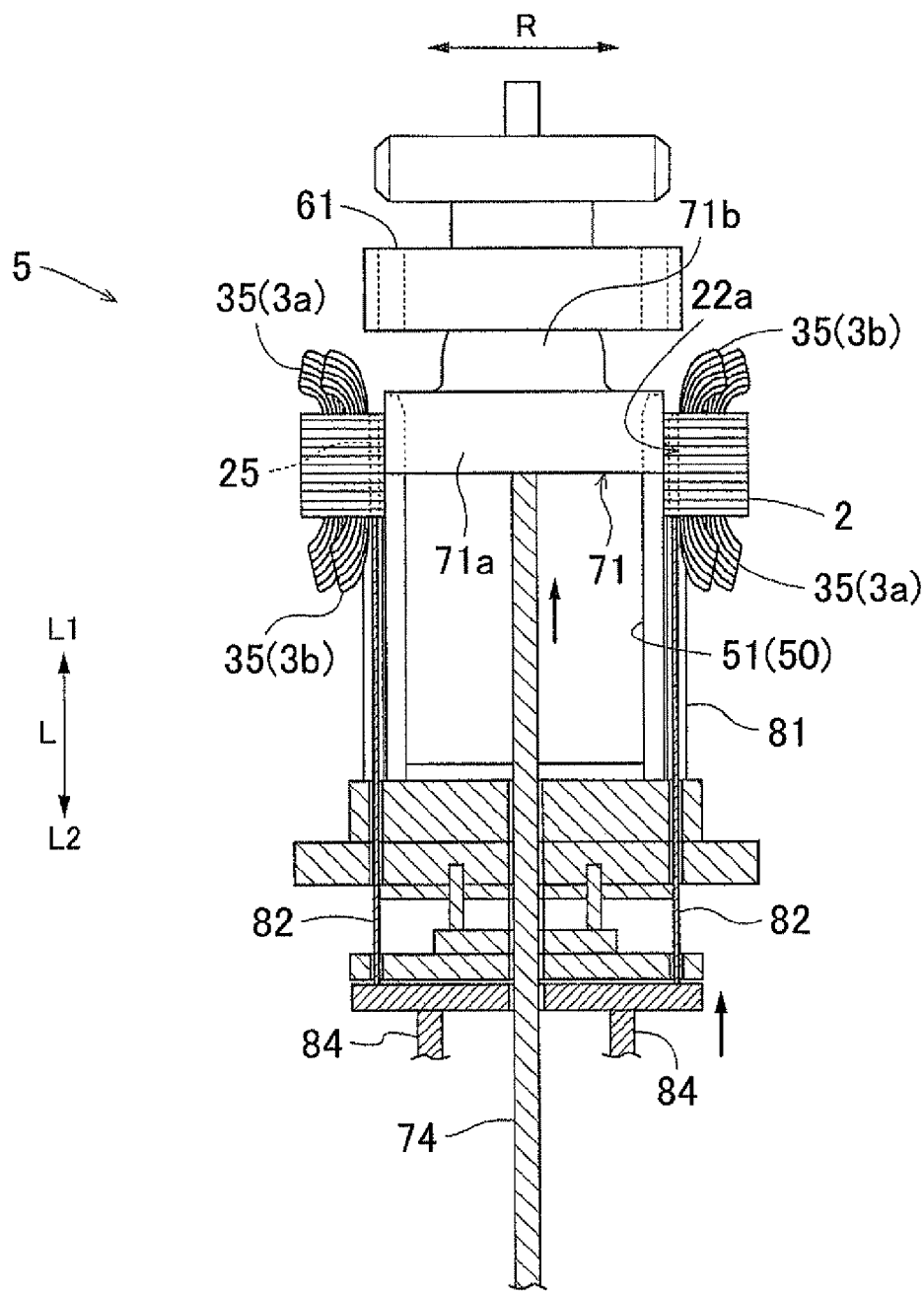
FIG. 17 is a diagram showing the state of the coil insertion apparatus in a second coil insertion step.

In the present embodiment, when the coil pushing-out unit 71 is moved in the second coil insertion step P43, the wedge pushing-up unit 82 is also moved along the axial direction L in synchronization with the coil pushing-out unit 71. Thus, the joint portions 35c of the annular conductors 35 are deformed, and at the same time, the wedges 25 are pushed up to a predetermined position below the lower end face of the stator core 2. Then, in the second coil insertion step P43 as well, the wedge pushing-up unit 82 is moved along the axial direction L in synchronization with the coil pushing-out unit 71. Thus, as shown in FIG. 17, the first portions 35a and the second portions 35b are inserted into the slots 22, and at the same time, the wedges 25 are also inserted into the slots 22. At this time, the coil pushing-out unit 71 is eventually moved to the position where the position of the upper end face thereof is located above the upper end face of the stator core 2. In this example, the coil pushing-out unit 71 and the wedges 25 are moved to the positions where the upper ends of the wedges 25 are aligned with the upper end face of the stator core 2 in the axial direction L.

Thus, the joint portions 35c of the annular conductors 35 after deformation are positioned so as to projecting from the stator core 2 in the axial direction L. The inner peripheral openings 22a of the slots 22 are closed by the wedges 25, and the coil 3 (the first coil portion 3a and the second coil portion 3b) after insertion into the slots 22 is held by the wedges 25 from the inner side of the stator core 2 in the radial direction R. In the present embodiment, the wedge pushing-up unit 82 is slid in synchronization with the coil pushing-out unit 71. Accordingly, the present embodiment is advantageous in that the wedges 25 can be easily inserted into the slots 22 while pressing the annular conductors 35 toward the bottoms of the slots 22 (toward the opposite side from the inner peripheral openings 22a; in this example, toward the outer side of the stator core 2 in the radial direction R).

Thereafter, the stator core 2 having the coil 3 wound thereon is detached from the coil insertion apparatus 5, whereby the stator 1 according to the present embodiment is completed. As described above, the method of manufacturing a stator according to the present embodiment can suppress damage to the coil 3. Moreover, the method of manufacturing a stator according to the present embodiment can increase the space factor of at least the first coil portion 3a. In this case, making a slight improvement in the coil insertion apparatus 5 of a commonly used configuration by providing the expanded portion 62a in each projecting tooth 62 allows the stator 1 having the 2-set wound coil 3 to be manufactured with no substantial change in the manufacturing process. That is, various effects described above can be obtained by making the slight improvement in the coil insertion apparatus 5 with a commonly used configuration without complicating the configuration of the coil insertion apparatus 5.

4. Other Embodiments

Lastly, other embodiments of the coil insertion apparatus and the method of manufacturing a stator by using the same according to the present invention will be described below. The configuration disclosed in each of the following embodiments may be combined with any of the configurations disclosed in the other embodiments as long as no consistency arises.

(1) The above embodiment is described with respect to an example in which the radial end face 62b of each projecting tooth 62 is placed so as to be located in the central portion of the corresponding slot 22 in the radial direction R. However, embodiments of the present invention are not limited to this. That is, the radial end face 62b of each projecting tooth 62 may be located at any position in the slot 22 as long as the radial end face 62b can press or compress a predetermined part of the annular conductors 35 of the first coil portion 3a in the radial direction R. For example, the radial end face 62b of each projecting tooth 62 in the slot 22 may be positioned in the range of ⅓ to ⅔ of the slot 22 in the radial direction R (the middle region in the case where the slot 22 is divided into three equal regions in the radial direction R), etc.

(2) The above embodiment is described with respect to an example in which the expanded portion 62a of each projecting tooth 62 is formed in a substantially rectangular shape as viewed in the axial direction L. However, embodiments of the present invention are not limited to this. That is, the expanded portion 62a may have any shape in cross section. For example, the expanded portion 62a may have a triangular, circular, or elliptical shape in cross section.

(3) The above embodiment is described with respect to an example in which the tilted surface 62c of each projecting tooth 62 is formed to have an arc shape in cross section. However, embodiments of the present invention are not limited to this. That is, the tilted surface 62c of each projecting tooth 62 may be in the shape of, e.g., a straight line, a bent line, or a curve other than the arc, in cross section along the radial direction R.

(4) The above embodiment is described with respect to an example in which each projecting tooth 62 has the tilted surfaces 62c at its both ends in the axial direction L. However, embodiments of the present invention are not limited to this. That is, it is preferable if the annular conductors 35 of the second coil portion 3b can be inserted into the slots 22 while the annular conductors 35 of the first coil portion 3a is smoothly pressed within the slots 22 in the radial direction R at least in the second coil insertion step S43. Thus, each projecting tooth 62 may have the tilted surface 62c only on one side in the axial direction L (in this example, the axial first direction L1 side). Alternatively, it is also preferable if the annular conductors 35 of the first coil portion 3a can only be smoothly pushed into slots 22 in the coil compression step P30. Thus, each projecting tooth 62 may have the tilted surface 62c only on one side in the axial direction L (in this example, the axial second direction L2 side). Alternatively, each projecting tooth 62 may not have the tilted surfaces 62c and may have angular ends on both sides in the axial direction L.

(5) The above embodiment is described with respect to an example in which in the coil compression step P30, the positioning unit 61 is moved along the axial direction L to the position where the lower end of the positioning unit 61 is aligned with the lower end of the stator core 2, in order that the coil compression step P30 is performed with the minimum required operation. However, embodiments of the present invention are not limited to this. That is, the positioning unit 61 may be moved to the position where the lower end face of the positioning unit 61 is located below the lower end face of the stator core 2. The positioning unit 61 may be moved to the position where the upper end of the positioning unit 61 is located below the lower end of the stator core 2, so that the positioning unit 61 is completely moved through the stator core 2.

Figure 18:
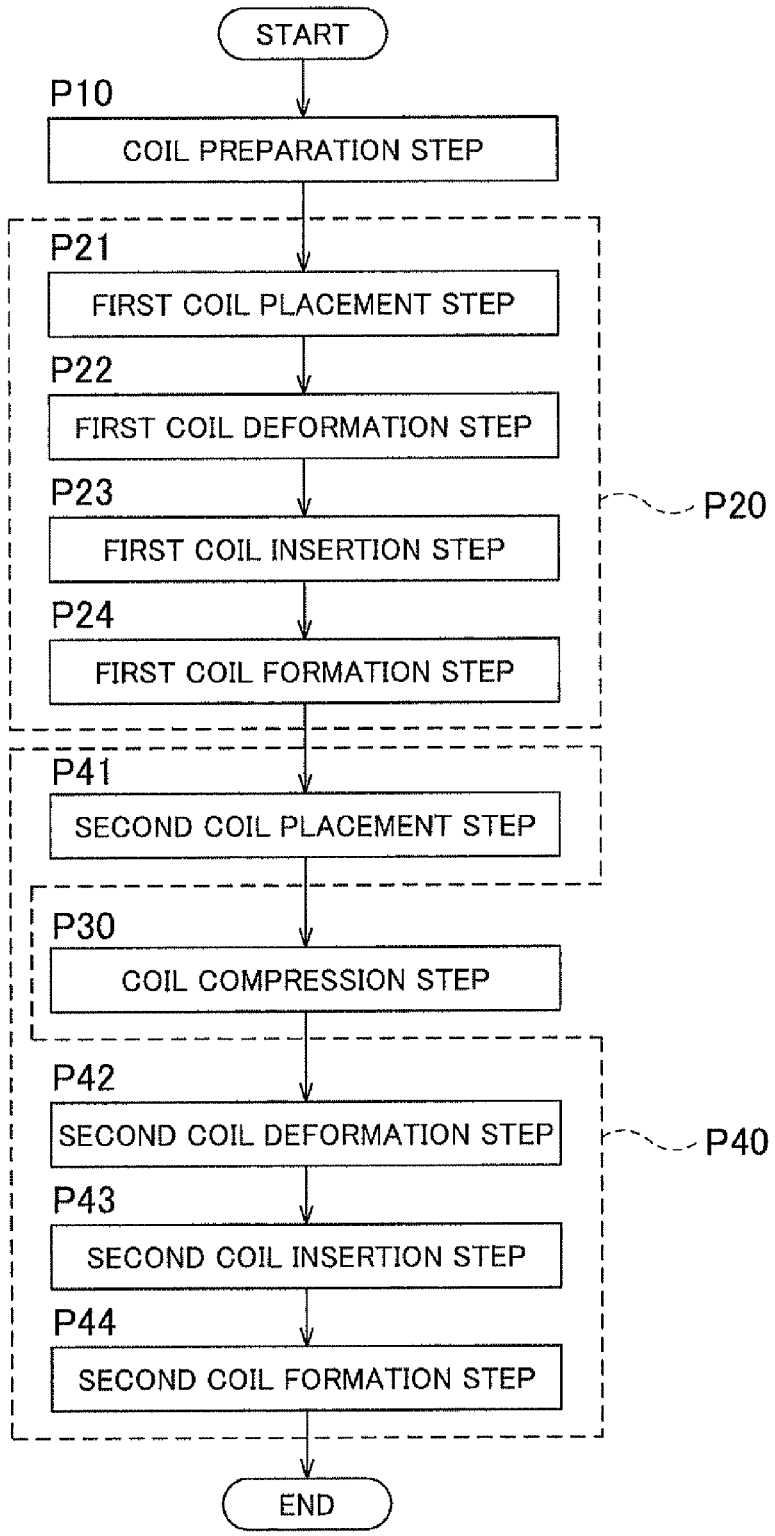
FIG. 18 is a flowchart illustrating a manufacturing process of a stator method of manufacturing a stator according to another embodiment.
Figure 19:
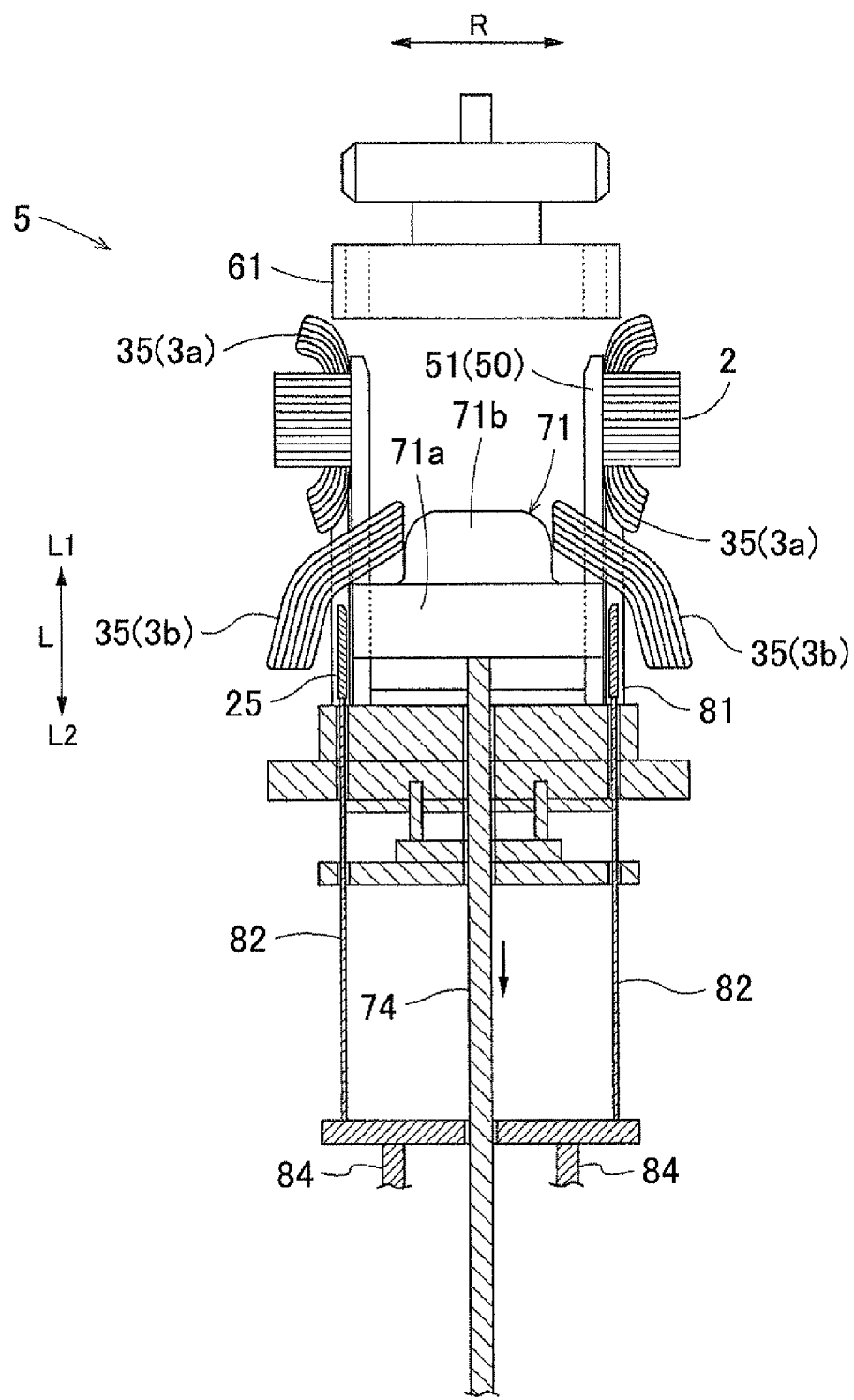
FIG. 19 is a diagram showing the state of a coil insertion apparatus in a second coil placement step according to the another embodiment.
Figure 20:
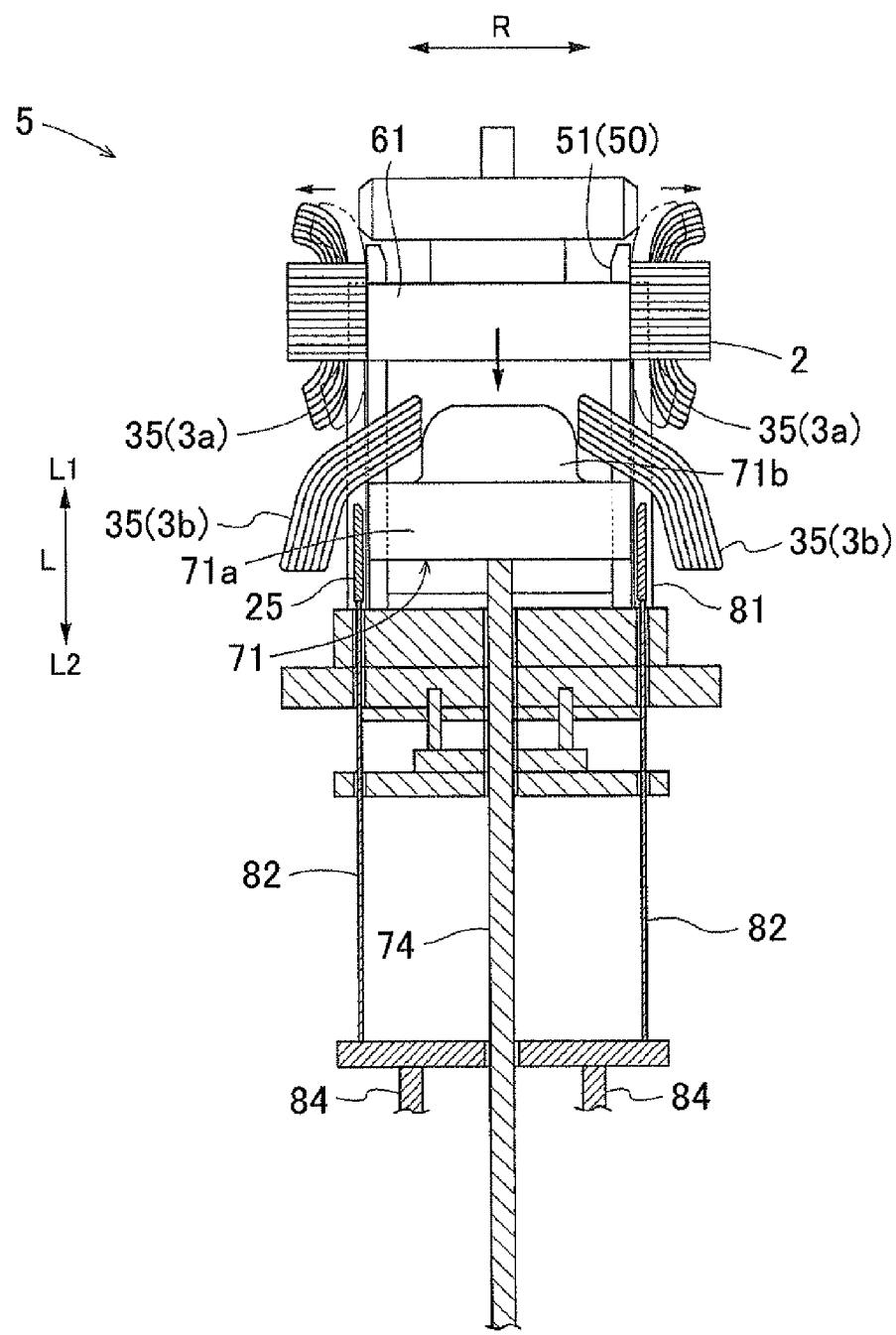
FIG. 20 is a diagram showing the state of the coil insertion apparatus in a coil compression step according to the another embodiment.

(6) The above embodiment is described with respect to an example in which the coil compression step P30 is performed between the first coil winding step P20 (the first coil formation step P24) and the second coil winding step P40 (the second coil placement step P41). However, embodiments of the present invention are not limited to this. That is, as shown in, e.g., FIG. 18, the coil compression step P30 may be performed during the second coil winding step P40. More specifically, the coil compression step P30 may be performed after the second coil placement step P41, with both the stator core 2 and the positioning unit 61 being mounted on the coil insertion apparatus 5. In this case, in the coil compression step P30, the positioning unit 61 is initially located on the first axial direction L1 side with respect to the coil holding unit 50 and the stator core 2 (see FIG. 19), and the positioning unit 61 is moved along the axial direction toward the axial second direction L2 side to the position where the lower end of the positioning unit 61 is aligned with the lower end of the stator core 2 (see FIG. 20). In this case, upon completion of the coil compression step P30, the positioning unit 61 is located at the position where the lower end thereof is aligned with the lower end of the stator core 2. Such a position of the positioning unit 61 matches that of the positioning unit 61 in the second coil deformation step P42 (see FIG. 9 showing the first coil deformation step P22). That is, this example is advantageous in that the coil compression step P30 can be performed during a series of rational operations in a transition stage from the second coil placement step P41 to the second coil deformation step P42 in the second coil winding step P40. In this case as well, in the subsequent second coil insertion step P43, the positioning unit 61 is moved in the axial direction L in synchronization with the movement of the coil pushing-out unit 71 in the axial direction L. Thus, the annular conductors 35 of the second coil portion 3b can be inserted into the slots 22 while pressing and recompressing the part of the first coil portion 3a, which is located in the slots 22, with the radial end face 62b of each projecting tooth 62 in the direction from the inner peripheral opening 22a of the slot 22 toward the inside of the slot 22.

(7) The above embodiment is described with respect to an example in which in both the coil compression step P30 and the second coil insertion step P43, the part of the first coil portion 3a, which is located in the slots 22, is pressed or compressed in the radial direction R by the positioning unit 61. However, embodiments of the present invention are not limited to this. That is, if the present invention is configured such that the first coil portion 3a is pushed out in the radial direction R by using the positioning unit 61 at least in the second coil insertion step P43, the first coil portion 3a may be compressed in the radial direction R in the coil compression step P30 by using other member (a dedicated compressing member) having a configuration or function similar to that of the projecting teeth 62 (the expanded portions 62a), without using the positioning unit 61.

(8) The above embodiment is described with respect to an example in which in the coil placement steps P21, P41, the first portion 35a of each annular conductor 35 is inserted into one of the hanging gaps 52, and the second portion 35b thereof is inserted into the hanging gap 52 located five pitches away from that hanging gap 52a. Thus, the stator 1 is manufactured in which the coil 3 for each phase is wound on the stator core 2 in a repeated pattern of two coils per phase along the circumferential direction C. However, embodiments of the present invention are not limited to this. For example, the first portion 35a of each annular conductor 35 may be inserted into one of the hanging gaps 52, and the second portion 35b thereof may be inserted into the hanging gap 52 located three pitches away from that hanging gap 52. In this case, the stator 1 can be manufactured in which the coil 3 for each phase is wound on the stator core 2 in a repeated pattern of one coil per phase along the circumferential direction C. Other than these examples, the number of the pitches between the pair of hanging gaps 52 in which the first portion 35a and the second portion 35b of each annular conductor 35 are inserted can be varied according to the manner in which the coil 3 for each phase is wound on the stator core 2.

(9) The above embodiment is described with respect to an example in which each of the first coil winding step P20 and the second coil winding step P40 has the coil placement step P21, P41, the coil deformation step P22, P42, the coil insertion step P23, P43, and the coil formation step P24, P44. The configuration of the coil insertion apparatus 5 and the method of manufacturing a stator, which are described in the above embodiment, are particularly useful for the configuration in which the coil deformation steps P22, P42 are performed in the first coil winding step P20 and the second coil winding step P40, respectively. Instead of providing the expanded portion 62a in each projecting tooth 62, the coil pushing-out unit 71 may be divided into multiple units, and a configuration corresponding to the expanded portion 62a may be provided in the pushing-in teeth 72 of one of the divided units of the coil pushing-out unit 71, as described in, e.g., the "Description of the Related Art" section. In this case, however, the divided coil pushing-out unit 71 that is operated relatively later is obstructed by the divided coil pushing-out unit 71 that is operated relatively earlier, and the joint portions 35c of the annular conductors 35 of the second coil portion 3b cannot be deformed between the coil pushing-out unit 71 and the positioning unit 61. This is not preferable because the spiral second coil portion 3b may not be appropriately wound on the stator core 2. In view of this, it is particularly preferable to provide the expanded portion 62a in each projecting tooth 62 of the positioning unit 61, and to perform the coil deformation step P22, P42 in each of the first coil winding step P20 and the second coil winding step P40. However, embodiments of the present invention are not limited to this. That is, the present invention is not prevented from being configured such that each of the first coil winding step P20 and the second coil winding step P40 does not have the coil deformation step P22, P42 and has only the coil placement step P21, P41, the coil insertion step P23, P43, and the coil formation step P24, P44.

(10) The above embodiment is described with respect to an example in which the wedges 25 are inserted into the slots 22 simultaneously with the first portions 35a and the second portions 35b of the annular conductors 35 in the second coil insertion step P43. However, embodiments of the present invention are not limited to this. That is, the wedges 25 may be inserted into the slots 22 in a step separate from the second coil insertion step P43 (a wedge insertion step). Such a wedge insertion step may be performed, e.g., between the second coil insertion step P43 and the second coil formation step P44, of after the second coil formation step P44.

(11) The above embodiment is described with respect to an example in which the coil preparation step P10 and the subsequent steps P20 to P44 are successively performed at the same location. However, embodiments of the present invention are not limited to this. That is, for example, the coil preparation step P10 may be performed at a different location in terms of time and/or geography, and the subsequent steps P20 to P44 may be performed by using the annular conductors 35 formed separately.

(12) The above embodiment is described with respect to an example of manufacturing of the stator 1 including the coil 3 having the spiral coil 3 (the spiral coil portions 3a, 3b). However, applications of the present invention are not limited to this, That is, the present invention is also applicable to manufacturing of any stator 1 including the coil 3 in which the link portions 31 of the coil end portions 32 protruding in the axial direction L from the stator core 2 are arranged in a pattern other than the spiral pattern (e.g., a concentric circle pattern) as viewed in the axial direction L, as long as the stator 1 includes an at least 2-set wound coil 3.

(13) The above embodiment is described with respect to an example of manufacturing of the stator 1 in which the coil 3 is wound on the stator core 2 by lap winding and distributed winding. However, applications of the present invention are not limited to this. For example, the present invention is not prevented from being applied to manufacturing of the stator 1 in which the coil 3 is wound on the stator core 2 by wave winding instead of the lap winding, or the stator 1 in which the coil 3 is wound on the stator core 2 by concentrated winding instead of the distributed winding.

(14) The above embodiment is described with respect to an example of manufacturing of the stator 1 for inner rotor type rotating electrical machines. However, applications of the present invention are not limited to this. That is, the present invention is also applicable to manufacturing of the stator 1 for outer rotor type rotating electrical machines. In this case, the positional relation in the radial direction R between the stator core 2 and the positioning unit 61. etc. is reversed from the above embodiment. Thus, for example, the radial end face 62b of each projecting tooth 62 of the positioning unit 61 is formed so as to extend to a position in the slot 22, which is located inward of the opening (in this example, an outer peripheral opening) of the slot 22 (toward the bottom of the slot 22; in this example, toward the inner side of the stator core 2 in the radial direction R). In the coil compression step P30, a predetermined part of the first coil portion 3a, which is located in the slots 22, is pushed out in the direction from the outer peripheral opening of the slot 22 toward the inside of the slot (in this example, toward the inner side of the stator core 2 in the radial direction R).

(15) Regarding other configurations as well, the embodiments disclosed in the specification are by way of example in all respects, and embodiments of the present invention are not limited to this. That is, the configurations that are not described in the claims can be modified as appropriate without departing from the object of the present invention.

The present invention can be used preferably for a method of manufacturing a stator by winding a coil on a stator core by using a coil insertion apparatus, and a coil insertion apparatus for the method of manufacturing a stator.

What is claimed is:

1. A method of manufacturing a stator by winding a coil on a stator core by using a coil insertion apparatus, wherein
the coil has a first coil portion and a second coil portion that are placed so as to adjoin each other in a radial direction when mounted on the stator core,
the coil insertion apparatus includes a coil holding unit that has blades arranged along a circumferential direction and extending in an axial direction so as to face teeth of the stator core, respectively, a positioning unit that is fitted on the blades to adjust a positional relation between the blades, and a coil pushing-out unit that pushes out the coil held in the coil holding unit toward slots of the stator core, and
the positioning unit has projecting teeth each extending between adjoining ones of the blades and protruding toward the stator core along a radial direction, and is formed such that a radial end face of each of the projecting teeth is located at a position in the slot, which is located inward of an opening of the slot, the method of manufacturing a stator comprising:
a first coil winding step of, with annular conductors of the first coil portion being placed in the coil holding unit, inserting the annular conductors into the respective slots by the coil pushing-out unit; and
a second coil winding step of, after the first coil winding step, with annular conductors of the second coil portion being placed in the coil holding unit, moving the positioning unit in the axial direction at least from one end of the stator core in the axial direction to the other end of the stator core in the axial direction, and inserting the annular conductors into the respective slots by the coil pushing-out unit while a part of the first coil portion, which is located in the slots, is pressed in a direction from the opening of the slot toward an inside of the slot by the radial end faces of the projecting teeth.

2. The method of manufacturing a stator according to claim 1, wherein
each of coil end portions of the first coil portion and the second coil portion, which protrudes from the stator core in the axial direction of the stator core, includes link portions connecting different ones of the slots of the stator core and extending in the circumferential direction of the stator core,
each of the link portions is placed such that one end of the link portion in the circumferential direction is located inward, in the radial direction, of any other of the link portions which is located at the same position as the link portion in the circumferential direction, and such that the other end in the circumferential direction is located outward, in the radial direction, of any other of the link portions which is located at the same position as the link portion in the circumferential direction, and
each of the first coil winding step and the second coil winding step has
a coil placement step of placing the annular conductors in the coil holding unit, in which the annular conductors are placed such that a first portion of each of the annular conductors is inserted into a first hanging gap formed between the blades, a second portion thereof is inserted into a second hanging gap located a predetermined pitch away from the first hanging gap, and a joint portion connecting the first portion and the second portion of each of the annular conductors extends on one side, in the axial direction, with respect to the first portion of any other of the annular conductors which is positioned to overlap the joint portion as viewed in the axial direction,
a coil deformation step of, after the coil placement step, with a position of the positioning unit being fixed with respect to the coil holding unit, moving the coil pushing-out unit in the axial direction along the blades to a set position where an axial interval between the positioning unit and the coil pushing-out unit is shorter than an overall length of the annular conductors in the axial direction before deformation, thereby deforming the joint portions of the annular conductors, and
a coil insertion step of after the coil deformation step, further moving the coil pushing-out unit in the axial direction to insert the first portions and the second portions of the annular conductors into the slots.

3. The method of manufacturing a stator according to claim 2, wherein
an end of the coil holding unit on an axial first direction side, which is one side of the coil holding unit in the axial direction, corresponds to open ends of the blades, and the coil holding unit has a holding portion that integrally holds the blades on an axial second direction side, which is the other side of the coil holding unit in the axial direction, with respect to the open ends,
the coil placement step in the second coil winding step is performed after the first coil winding step with the positioning unit being located on the axial first direction side with respect to the coil holding unit, and
between the coil placement step of the second coil winding step and the coil deformation step of the second coil winding step, the positioning unit is moved in the axial direction toward the axial second direction side from a position on the axial first direction side with respect to the coil holding unit to a position where an end of the positioning unit on the axial second direction side is aligned with the end of the stator core on the axial second direction side, or to a position located on the axial second direction side with respect to the position where the end of the positioning unit on the axial second direction side is aligned with the end of the stator core on the axial second direction side, and in the coil insertion step of the second coil winding step, the positioning unit is moved in the axial direction toward the axial first direction side.

4. A coil insertion apparatus for winding a coil on a stator core, comprising:
a coil holding unit that has blades arranged along a circumferential direction and extending in an axial direction so as to face teeth of the stator core, respectively; a positioning unit that is fitted on the blades to adjust a positional relation between the blades; and a coil pushing-out unit that pushes out the coil held in the coil holding unit toward slots of the stator core, wherein the positioning unit has projecting teeth each extending between adjoining ones of the blades and protruding toward the stator core along a radial direction, and the positioning unit is formed such that, with the positioning unit being placed at the same position in the axial direction as the stator core, a radial end face of each of the projecting teeth is located at a position in the slot, which is located inward of an opening of the slot.

5. The coil insertion apparatus according to claim 4, wherein the radial end face has a width in the circumferential direction which corresponds to a width of the slot in the circumferential direction, and the radial end face is placed at a position in the radial direction, which divides an area of a cross section perpendicular to the axial direction of the slot into two equal parts.

6. The coil insertion apparatus according to claim 4, wherein the projecting tooth has a tilted surface that extends in the radial direction from the opening of the slot toward an inside of the slot as the tilted surface extends from an end of the projecting tooth in the axial direction toward a central portion of the projecting tooth in the axial direction.

7. The coil insertion apparatus according to claim 5, wherein the projecting tooth has a tilted surface that extends in the radial direction from the opening of the slot toward an inside of the slot as the tilted surface extends from an end of the projecting tooth in the axial direction toward a central portion of the projecting tooth in the axial direction.

* * * * *